(12) United States Patent
Kitagawa et al.

(10) Patent No.: US 6,999,605 B2
(45) Date of Patent: Feb. 14, 2006

(54) PICTURE MATCHING PROCESSING ACCORDING TO ENVIRONMENT VARIATIONS

(75) Inventors: Hiroki Kitagawa, Kawasaki (JP); Daiki Masumoto, Kawasaki (JP); Naoki Sashida, Kawasaki (JP); Masahiko Sugimura, Kawasaki (JP); Shigemi Nagata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 695 days.

(21) Appl. No.: 09/768,361

(22) Filed: Jan. 25, 2001

(65) Prior Publication Data

US 2001/0038713 A1    Nov. 8, 2001

(30) Foreign Application Priority Data

Apr. 27, 2000  (JP) .............................. 2000-128189

(51) Int. Cl.
*G06K 9/00* (2006.01)

(52) U.S. Cl. ........................ 382/118; 382/117; 382/190; 382/195; 382/216; 340/5.53; 340/5.83

(58) Field of Classification Search ................ 382/115, 382/116, 117, 118, 181, 190, 195, 205, 209, 382/216; 340/5.1, 5.2, 5.8, 5.81, 5.82, 5.83; 348/42, 47, 77, 78
See application file for complete search history.

(56) References Cited

U.S. PATENT DOCUMENTS 5,982,912 A * 11/1999 Fukui et al. ................. 382/118
6,181,805 B1 * 1/2001 Koike et al. ................. 382/118
6,463,176 B1 * 10/2002 Matsugu et al. ............. 382/195
6,466,685 B1 * 10/2002 Fukui et al. ................. 382/115

FOREIGN PATENT DOCUMENTS

JP    7-249119    9/1995
JP    11-306354   11/1999

OTHER PUBLICATIONS

Yael Adini, Yael Moses, Shimon Ullman; Face Recognition: The Problem of Compensating for Changes in Illumination Directio Jul. 1997; IEEE Transactions on Pattern Analysis and Machine Intelligence; pp. 721-732.*

* cited by examiner

Primary Examiner—Kanjibhai Patel
Assistant Examiner—John Strege
(74) Attorney, Agent, or Firm—Staas & Halsey LLP

(57) ABSTRACT

A window picture (robust window picture) is selected as a model window picture, which is unlikely to be influenced by the variations in an environment and selected irrespective of the variations in an environment of pictures assumed to be inputted in a recognition phase. Alternatively, a window picture (stable window picture) is selected as a model window picture, in which the changes in a feature value are small even though an environment is varied. For example, a tracking window picture group is obtained from a registered picture group in which an environment is continuously varied, by tracking window pictures of a basic registered picture. Then, a static extraction window picture is obtained by extracting window pictures as independent pictures from a series of pictures. Then, a window picture selected both in the tracking window picture group and in the static extraction window picture is set as a robust window picture, and picture matching is conducted using the robust window picture.

15 Claims, 17 Drawing Sheets

Registered picture group 100

Tracking window picture group 110

Static extraction window picture 120

Robust window picture 130

Registered picture group 100

Tracking window picture group 110

Static extraction window picture 120

Robust window picture 130

Movement of a face (from the top of the head) 800

Movement of a face (from the front) 810

Window picture of the right eye and window picture of the nose 820

Variations in a feature value of the window picture of the right eye 830

Registered picture 900

Window pictures of the right eye and the nose 910

Variations in a feature value of the window picture of the right eye 920

Variations in a feature value of the window picture of the nose 930

Variations in a feature value of the window picture of the nose(interpolated) 940

Variations in a feature value of the window picture of the nose(interpolated) 950

Model picture

Recognition target picture

PICTURE MATCHING PROCESSING ACCORDING TO ENVIRONMENT VARIATIONS

BACKGROUND OF THE INVENTION

1. Field of the Invention

The present invention relates to picture matching processing for matching a picture containing a recognition target inputted through a picture input apparatus such as a camera with a previously registered picture, thereby identifying a target in the input picture. A picture matching processing system of the present invention is applicable to recognition processing for any two-dimensional or three-dimensional object such as a person and a consumer product.

2. Description of the Related Art

While an application requiring picture matching processing is being spread, there is an increased demand for a technique of searching and cutting out a three-dimensional object such as a person and an article appearing in a picture captured through a picture input apparatus such as a camera, followed by recognition and matching. Among techniques of recognizing a recognition target in a captured picture, several excellent techniques are known. One of them is a picture matching processing technique using an Eigen-Window method. Another is a picture matching processing technique using an improved Eigen-Window method, in which a feature value of a picture is converted to a discrete cosine transform (DCT) coefficient.

Hereinafter, the picture matching processing technique using an improved Eigen-Window method will be described as a conventional picture matching processing technique. The case will be described in which a person's face picture is recognized and matched.

The picture matching processing using an improved Eigen-Window method consists of a "registration phase" for creating a model used for picture matching, and a "recognition phase" for conducting recognition and matching processing with respect to a recognition target of an input picture.

First, a procedure of the "registration phase" will be described with reference to a flow chart in FIG. 13. In the registration phase, a two-dimensional or three-dimensional object to be recognized and matched (i.e., a basic posture picture (front picture, etc.) of a person's face to be recognized) is generated and registered as a model for matching.

(1) A person's face picture to be a model picture is obtained (Operation 1301). Captured picture data of a front face picture may be inputted from outside in a file format. In the case where there is no appropriate data, a person's front face picture to be registered is captured through a picture input apparatus such as a camera. Herein, as an example, it is assumed that a model picture shown in FIG. 15A is captured.

(2) Feature points are detected from the captured model picture (Operation 1302). The feature points are detected and selected by using some index. For example, there is a method of selecting a point at which a texture degree (index regarding the complexity of texture that is a surface pattern of a picture) is equal to or larger than a threshold value, a point at which an edge intensity (index regarding an edge component) is equal to or larger than a threshold value, and a specific point in a picture such as a point at which color information is in a predetermined range. There is also a method of utilizing the knowledge regarding a recognition target in a captured picture and selecting important portions thereof (feature portions such as eyes and a mouth). In FIG. 16A, points assigned to a face picture (i.e., a model picture) schematically represent feature points.

(3) A small region surrounding the selected feature points (e.g., a rectangular local region) is selected as a window picture (Operation 1303). Every local region on the periphery of every feature point is selected as a window picture, respectively. For example, this window picture may be a small square of 15 pixels×15 pixels.

(4) The selected window picture is compressed to a lower-order dimensional space to a degree that it is still effective for recognition, and organized and stored as a model for each model picture (Operation 1304). As a method for compression to a lower-order dimensional space, an Eigen-Window method may be used. However, herein, an improved Eigen-Window method is used. The Eigen-Window method calculates a DCT coefficient from window picture data, and appropriately selects a coefficient of a low frequency excluding a DC component, thereby compressing the window picture to a lower-order dimensional space. According to the improved Eigen-Window method, a compression method using a DCT is used. For example, the window picture that is an original picture is composed of 15 pixels×15 pixels (i.e., the window picture is 225-dimensional); in this case, a DCT coefficient is calculated, and 20 coefficients of a low frequency satisfactorily representing picture features excluding a DC component are selected so as to compress the window picture to a 20-dimensional picture. FIG. 16A schematically shows a state where the window picture is projected onto the lower-order dimensional space.

(5) The compression to a lower-order dimensional space in Operation 1304 is applied to all the window pictures, and the data thus obtained is registered and managed as model data for picture matching (Operation 1305).

By the above-mentioned processing in the registration phase, a model for matching of a lower-order dimensional picture is generated from a person's face picture and registered.

Next, the procedure of the "recognition phase" processing will be described with reference to a flow chart in FIG. 14.

(1) A person's face picture is captured in which a person's face picture to be a recognition target appears (Operation 1401). Captured picture data of a front face picture may be inputted from outside in a file format. In the case where there is no appropriate data, a person's front face picture to be registered is captured through a picture input apparatus such as a camera. The latter case is often used for an entering/leaving management system. Herein, it is assumed that a picture to be a recognition target shown in FIG. 15B is captured.

(2) A person's face picture to be a recognition picture is cut out from the input picture (Operation 1402). In this case, the position of a person's face picture region to be a recognition target may be estimated, or a predetermined rectangular region may be cut out. As a method for estimating the position of a person's face picture region, it is known to estimate a face picture region by detecting a skin region.

(3) Feature points are detected from the cut out recognition target face picture (Operation 1403). The feature points may be selected by using the same index as that in the registration phase. Alternatively, the feature points may be selected by using another appropriate index.

(4) A local region is selected as a window picture, based on the selected feature points (Operation 1404). In the same way as in the registration phase, for example, a window picture of 15 pixels×15 pixels is selected. FIG. 16B schematically shows this state.

(5) The selected window picture is compressed to the same lower-order dimensional space as that in the registration phase (Operation 1405). Herein, in the same way as in the registration phase, a method for compressing a window picture to a lower-order dimensional space, using an improved Eigen-Window method is used. More specifically, a DCT coefficient is calculated from a window picture that is an original picture, and 20 coefficients of a low frequency effectively representing picture features excluding a DC component are selected, whereby the window picture is compressed to a 20-dimensional space.

(6) Recognition target data is projected onto the above-mentioned feature space (that is a lower-order dimensional space) for each window picture (Operation 1406). FIG. 16B schematically shows this state.

(7) A pair of registered window picture and recognition target window picture, of which distance is small in the feature space, is found, whereby the window pictures are matched with each other (Operation 1407).

(8) Relative positions are obtained in a pair of window pictures, and voting is conducted with respect to a corresponding grid on a voting map (Operation 1408). FIG. 17 schematically shows this state. Herein, the voting map refers to a voting space obtained by partitioning a plane prepared for each model picture into a grid shape, and voting refers to processing of adding an evaluation value to a grid on a voting map in accordance with voting. The grid position to be voted is determined in accordance with a relative position in a pair of window pictures in the feature space. For example, if both of them are at the same position, a relative position becomes 0, which is voted to the center of the voting map. If a face picture of a registered model and a face picture of a recognition target are of the same person, many window pictures such as an eye and a mouth exactly correspond to each other; therefore, the relative positions of the window pictures corresponding to each other become almost constant, and votes will be concentrated on the same grid position on the voting map. On the other hand, if a face picture of a registered model is different from a face picture of a recognition target, the number of window pictures that do not correspond to each other increases, and the relative positions of these window pictures are varied. Therefore, votes will be dispersed in a wide range on the voting map.

(9) A grid having the largest number of votes (hereinafter, referred to as a "peak") is found, the similarity between a face picture of a registered model and a face picture of a recognition target is calculated based on the number of votes obtained, and picture recognition and matching are conducted based on the calculation results (Operation 1409). Furthermore, it can be detected from the position of the peak where a registered object is positioned in the recognition target picture.

According to the above-mentioned picture matching method, it can be recognized whether or not an object in an input picture is identical with an object of a registered model previously prepared.

The picture matching processing technique using an improved Eigen-Window method has many excellent aspects, and the widespread use of a picture matching processing system adopting this technique is expected. However, in spreading such a picture matching processing system using an improved Eigen-Window method, the following challenges should be addressed.

The first challenge is to ensure the robustness against the variations in an environment for capturing a face picture, such as light environment and a capturing direction of a person's face picture. More specifically, it is required that even when the environment for capturing a picture used for model picture registration is different from the environment for capturing a picture of a recognition target person, a high picture matching precision should be maintained. It is assumed that a picture matching processing system is used in various places, and it cannot be expected that the environment for capturing a picture is maintained at a constant level. For example, regarding a light environment, natural light (sunlight) is varied depending upon the time (morning, noon, and evening), and also depending upon the weather (fine, cloudy, and rainy). Furthermore, even in a room with less influence of outer light, the intensity and direction of artificial light may be varied. Furthermore, regarding a capturing environment such as a capturing direction and a capturing position of a subject, a person whose picture is to be captured does not always face a camera, and the distance between the subject and the camera is not necessarily constant. It is desirable that a person to be a subject is instructed to face a camera at a predetermined position; however, an application capable of conducting this operation is limited, which causes a lot of trouble on the user side in terms of convenience of use.

As one conventional technique of ensuring the robustness against the variations in an environment for capturing a face picture, the following picture matching processing is known: a picture is captured by photography for each capturing environment assumable with respect to each subject, registered in the registration phase; and a captured picture of a recognition target person is matched with a model picture prepared for each variation of a capturing environment for each model in the recognition phase. However, according to this method, the number of picture matching processing steps becomes large, which leads to an increase in a processing time, and increases the capacity of model data to be registered.

Furthermore, as another conventional technique of ensuring the robustness against the variations in an environment for capturing a face picture, picture matching processing is known, in which an environment such as light conditions, a capturing direction, and a capturing position is changed in capturing a face picture from a recognition target person in the recognition phase, whereby a number of pictures of variations in various capturing environments are captured for use in picture matching. For example, a recognition target person is instructed to slowly turn his/her face by 180°, so that a face picture is captured in various directions. However, according to this method, the number of steps for face picture capturing processing from a recognition target person in the recognition phase is increased, which results in an increase in a processing time in the recognition phase. Furthermore, it is required to ask cooperation regarding the position and direction of a camera for a recognition target person, which causes a number of problems in terms of user friendliness.

The second challenge is to reduce a picture matching processing time while maintaining a picture matching precision at a predetermined level or more. According to the picture matching processing using an improved Eigen-Window method, as described above, the correspondence between a window picture selected from a model picture and a window picture selected from a recognition target picture is obtained, and picture matching is conducted by evaluating the matching degree. As the number of selected window picture regions is increased, the number of steps of processing such as projection onto a projection space and evaluation of the matching degree of the projection results is increased. This might lead to an increase in a processing time. On the other hand, if the number of window picture regions to be selected is simply decreased, the number of processing steps is also simply decreased, resulting in a decrease in a processing time. However, in the case of simply decreasing the number of window picture regions, a picture matching precision may be degraded. Thus, according to the processing of simply decreasing the number of window regions, reduction of a processing time and maintenance of a picture matching precision have a trade-off relationship. Therefore, in the prior art, either one of the challenge of decreasing a processing time and the challenge of maintaining a picture matching precision is addressed while the other is sacrificed.

The third challenge is to reduce the volume of model data to be registered as a model. If the number of recognition persons dealt with by the picture matching processing system is increased, and variations in a capturing environment are increased, the volume of data required to be registered and maintained as model data is also increased. If the volume of model data is narrowed by simply reducing the variations in a capturing environment irrespective of the variations in a capturing environment, the volume of model data to be registered can be reduced; however, the robustness against the variations in a capturing environment cannot be ensured, and the system becomes weak with respect to the variations in a capturing environment, which might lead to a decrease in a picture matching processing precision.

SUMMARY OF THE INVENTION

Therefore, with the foregoing in mind, it is an object of the present invention to provide a picture matching processing system that is highly robust against the variations in an environment for capturing a face picture, such as a light environment and a capturing direction, with respect to a captured recognition target object picture, using a further improved Eigen-Window method.

Further, another object of the present invention is to provide a picture matching processing system capable of reducing the number of processing steps of picture matching, and reducing a picture matching processing time while maintaining a picture matching precision at a predetermined level or more.

Further, still another object of the present invention is to provide a picture matching processing system capable of reducing the volume of model data to be registered as a model, and maintaining a picture matching precision at a predetermined level or more even at a small volume of model data.

Further, still another object of the present invention is to provide a user-friendly picture matching processing system that allows sufficient picture matching even with one or a few face pictures of a recognition target person in a recognition phase, does not request a person to take a predetermined special capturing posture (e.g., turning one's head) for capturing a face picture, and allows sufficient picture matching even with a face picture captured from a normal direction that is generally assumed, such as a front direction.

In order to solve the above-mentioned problem, the picture matching processing system of the present invention includes: a window picture cutting part for cutting out characteristic window pictures from a previously captured recognition target picture; a capturing environment variation influence evaluating part for evaluating the influence of variations in a capturing environment of the cut out window pictures; and a window picture selecting part for selecting a window picture in which the influence of variations in a capturing environment is at a predetermined level or less among the cut out window pictures, based on results of the evaluation of the influence of variations in a capturing environment, wherein picture matching is conducted by using the selected window picture.

Because of the above-mentioned structure, a local region that is robust and unlikely to be influenced by the variations in a capturing environment is selected as a window picture, and window pictures that are likely to be influenced by the variations in a capturing environment are removed, whereby a picture matching processing system can be generated, which has high robustness against the variations in an environment, and can maintain a picture matching precision at a predetermined level or more.

The picture matching processing system of the present invention includes: a picture group input part for previously inputting a plurality of pictures of a recognition target in different capturing environments to organize them as a picture group; a first window picture cutting part for cutting out a first characteristic window picture group from each picture of the recognition target, based on a first standard in which variations in a capturing environment are not considered; a second window picture cutting part for cutting out a second characteristic window picture group from each picture of the recognition target, based on a second standard in which variations in a capturing environment are considered; and a robust window picture selecting part for selecting, as a robust window picture, a window picture contained both in the first window picture group cut out based on the first standard and in the second window picture group cut out based on the second standard, wherein picture matching is conducted by using the selected robust window picture.

Because of the above-mentioned structure, a window picture can be selected irrespective of whether or not the variations in a capturing environment are considered, whereby a robust window picture with high robustness that is always selected irrespective of the variations in a capturing environment can be set as a model window picture.

If window pictures corresponding to each other in the same site of the recognition target are set as a window picture set, among the window pictures cut out from each picture, and a robust window picture set is selected on the basis of a window picture set, a window picture set can be selected as a robust window picture set irrespective of whether or not the variations in a capturing environment are considered, and a robust window picture set with high robustness that is always selected irrespective of the variations in a capturing environment can be set as a model window picture group.

In the above-mentioned picture matching processing system, it is preferable that the picture group previously captured by the picture group input part is a picture group composed of a plurality of series of pictures of a recognition target while continuously varying a capturing environment, the first standard is a standard for tracking each site (such as an eye and a mouth) of the recognition target in the series of pictures of the picture group, thereby cutting out window picture set; and the second standard is a standard for cutting out characteristics window pictures from each picture of the picture group as independent pictures.

The above-mentioned structure is an example of a standard considering a capturing environment and a standard not considering a capturing environment.

The picture matching processing system of the present invention includes: a picture group input part for previously inputting a plurality of pictures of a recognition target in different capturing environments to organize them as a picture group; a window picture cutting part for cutting out a characteristic window picture group from each picture of the recognition target; a feature value calculating part for calculating a feature value representing features of the cut out window pictures; and a stable window picture selecting part for setting a window picture group in which window pictures correspond to each other in the same site of the recognition target as a window picture set, among the window pictures cut out from each selected picture, comparing feature values of the window pictures contained in the window picture set, and selecting, as a stable window picture set, only a window picture set in which a variation width of the feature value is within a predetermined threshold value, wherein picture matching is conducted by using the selected stable window picture set.

Because of the above-mentioned structure, window pictures corresponding to each other in the same site are compared with each other, whereby a stable window picture set in which the variations in a feature value are within a predetermined threshold value can be selected as a model window picture, and window pictures which are likely to be influenced by the variations in a capturing environment and are subjected to large variations in a feature value can be removed.

In the above-mentioned structure, it is preferable that the picture group is a continuous picture group in which a capturing environment is continuously changed; and in comparison of the feature values of the window pictures contained in the window picture group, the compared feature values are a feature value of the window picture cut out from a first picture of the continuous picture group, a feature value of the window picture cut out from a last picture of the continuous picture group, and a feature value of the window picture cut out from at least one selected intermediate picture.

Because of the above-mentioned structure, it is possible to identify a stable window picture set by projecting a minimum required number of window pictures without projecting all the window pictures onto an eigen space.

Further, the picture matching processing system of the present invention includes a projecting part for setting a window picture group in which window pictures correspond to each other in the same site of the recognition target, among the window pictures cut out from each selected picture, and projecting the window picture group onto an eigen space having the feature value as a parameter, in accordance with the feature value, wherein the projecting part, in selecting a window picture used for projection, selects a window picture cut out from a first picture of the continuous picture group, a window picture cut out from a last picture of the continuous picture group, and a window picture cut out from a selected intermediate picture in the continuous picture group, in accordance with a projection point tracking precision, wherein picture matching is conducted by using the selected window pictures.

Because of the above-mentioned structure, in the case of obtaining a projection point track in an eigen space of a window picture group, it is possible to determine the number of projection points in accordance with the required projection point tracking precision, and estimate an outline shape of the projection point track based on the projection points.

The picture matching processing system of the present invention can be constructed, using a computer, by reading a processing program from a computer-readable recording medium storing processing steps of realizing the above-mentioned picture matching processing system.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of embodiments of a picture matching processing system. In the following, the case will be described in which a face picture is applied to picture matching.

In the picture matching processing system of the present invention, the influence of the variations in a capturing environment upon a window picture is evaluated, and a window picture in which the influence of variations in a capturing environment is within a predetermined level or less is selected as a model window picture for use in picture matching. Examples of a method for evaluating the influence of the variations in a capturing environment upon a window picture and a standard for selection of a window picture are roughly classified into two types, which will be described below.

One type is picture matching processing that uses a robust window picture, as a model window picture. The robust window picture is a window picture subjected to less influence of variations in an environment (i.e., having high robustness against the variations in an environment), irrespective of the variations in an environment of a picture that are assumed to be inputted in a recognition phase. The other type is picture matching processing that compares feature values between stable window pictures having less variation in feature values irrespective of the variations in an environment, (i.e., window pictures corresponding to each other in the same site of recognition pictures captured in different capturing environments), and uses the stable window picture as a model window picture. A stable window picture has a variation range of a feature value at a predetermined threshold level or less. The robust window picture refers to a window picture which has an absolute value of a feature value beyond a predetermined level in every capturing environment, and selected as a characteristic local region. The stable window picture refers to a window picture which has a stable absolute value of a feature value, and always exceeds a predetermined level irrespective of the variations in a capturing environment.

Hereinafter, an exemplary structure of a picture matching system using a robust window picture will be described in Embodiment 1, an exemplary structure of a picture matching system using a stable window picture will be described in Embodiment 2, and the other structure will be described in Embodiment 3.

Embodiment 1

The basic principle, structure, and operation of a picture matching system using a robust window picture will be described.

First, the principle of extracting a robust window picture having high robustness against the variations in an environment, used in the picture matching processing system of the present invention, will be described.

Figure 1:
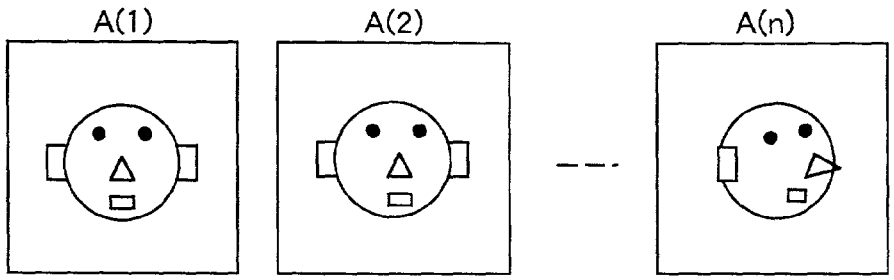
FIG. 1 schematically illustrates a principle of extracting a robust window picture used in a picture matching processing system of the present invention.
Figure 1:
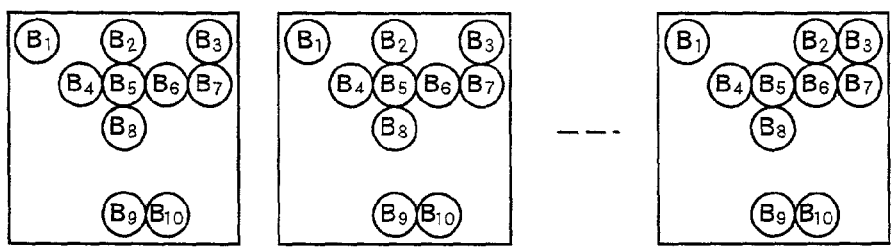
Figure 1:
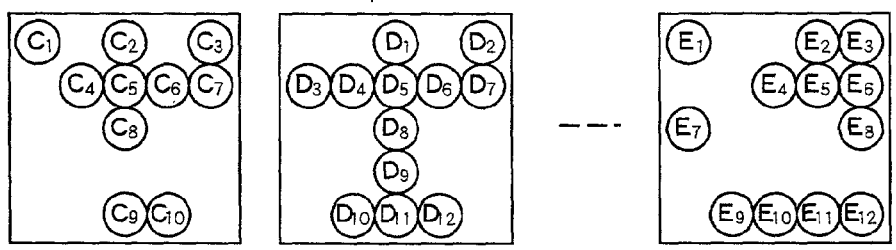
Figure 1:
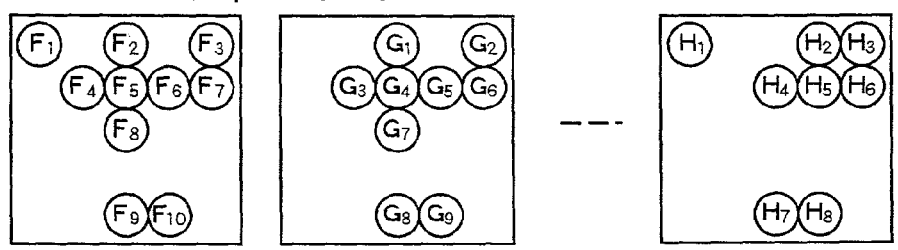

FIG. 1 schematically illustrates the first principle of extracting a robust window picture.

The first stage in FIG. 1 is a registered picture group 100, which includes a plurality of pictures of the same person. Herein, as variations in a capturing environment, a posture is changed continuously, thereby obtaining a series of pictures in which a posture is changed continuously at a predetermined interval. The registered picture group 100 includes a group of n pictures: a registered picture A(1), a registered picture A(2), . . . , a registered picture A(n) from the left side. Herein, for convenience, the first registered picture A(1) is prescribed as a basic registered picture. Further, for simplicity of description, although pictures between the registered picture A(2) and the registered picture A(n) are omitted, it is assumed that intermediate pictures in which a posture is changed are given between the registered picture A(2) and the registered picture A(n). The number of intermediate pictures and the interval of the variations in a capturing environment are not particularly limited.

FIG. 1 shows an example in which a capturing environment is varied by continuously changing a posture. However, it is preferable that a capturing environment should be varied by assumed variations in a recognition phase. In order to generate a model window picture that is unlikely to be influenced by the difference in a capturing environment of an input picture in the recognition phase, it is required to verify the robustness against various variations in a capturing environment. Herein, there are many differences assumed in a capturing environment: a relative position (distance, direction) between a person and a camera, light conditions (light source conditions such as light, a wavelength of light, and a spectrum), a relative position (distance, direction) between a person and light, changes in time (e.g., a hair style, eyeglasses, presence/absence of a mustache), changes in facial expressions (e.g., stony face, smile), and the like. These are examples, and the present invention is not limited to the above-mentioned differences in a capturing environment.

The second stage in FIG. 1 schematically shows a tracking window picture set 110. As a first window picture selection standard in which the variations in a capturing environment are not considered, extraction of a widow picture by tracking is used. An exemplary method for extracting a window picture by tracking will be described. As described above, herein, the first registered picture A(1) is prescribed as a basic registered picture among the registered picture group. The tracking window picture set 110 refers to a set of window pictures obtained by tracking, over each pictures of the registered picture group, window pictures corresponding to each (e.g., eyes, a nose, a mouth) in the registered pictures extracted as window picture sets from the basic registered picture. More specifically, in the case where the site of the left eye is extracted as a window picture in the first registered picture A(1) that is a basic registered picture, the tracking window picture set refers to a set of window pictures of the site of the left eye obtained by extracting a window picture of the site of the left eye in each picture by tracking a series of pictures of the entire registered window pictures. Herein, it is important that a series of pictures are not extracted as each window picture independently, but each window picture corresponding to the same site in the basic registered picture is selected by tracking over each picture of the registered picture group. After all, a window picture obtained by tracking becomes a tracking result of the same site window picture present in the registered picture of each variation in the environment, ignoring the influence of the variations in the environment.

A state of extraction of a tracking window picture set in FIG. 1 will be described. In the example shown in FIG. 1, there are 10 window pictures: B1(A1), B2(A1), . . . , B10(A1), extracted from the basic registered picture A(1). Positions of the picture sites corresponding to 10 window pictures in the respective intermediate registered window pictures are extracted by tracking. In the registered picture A(2), window pictures: B1(A2), B2(A2), . . . , B10(A2), which are tracking results from the registered picture A(1), are extracted. In the registered picture A(n), window pictures: B1(An), B2(An), . . . , B10(An), which are tracking results from the registered pictures A(1), A(2), . . . , A(n-1), are extracted, respectively. As a result, 10 tracking window picture sets B1(An), B2(An), . . . , B10(An) are obtained.

The third stage in FIG. 1 schematically shows a static extraction window picture 120. Static extraction of a window picture is used as a second window picture selection standard in which the variations in a capturing environment are considered. The static extraction window picture is obtained by independently extracting a window picture from a series of pictures contained in the registered picture group. More specifically, the static extraction window is obtained by extracting a widow picture from a picture in each capturing environment prepared for various variations in a capturing environment. This becomes a window picture cut out from a recognition target picture under the influence of each capturing environment. The static extraction window picture may be a window picture extracted from each registered picture as a result of the variations in an environment.

A state of extracting a static extraction window picture will be described in FIG. 1. There are window pictures: C1(A1), C2(A1), . . . , C10(A1) extracted from the basic registered picture A(1). These window pictures are the same as the window pictures: B1(A1), B2(A1), . . . , B10(A1) in the second stage. Next, in the example shown in FIG. 1, window pictures: D1(A2), D2(A2), . . . , D12(A2) are statically (i.e., independently) extracted from the registered picture A(2). Herein, it is assumed that 12 window pictures are extracted. That is, the registered picture A(2) is different from the registered picture A(1) in an environment, so that the number of window pictures to be extracted changes. More window pictures may be extracted, compared with the registered picture A(1), or less window pictures may be extracted, compared therewith. More specifically, it may be possible that a window picture extracted by tracking in extraction of a tracking window picture is not extracted as a window picture in static extraction. Conversely, it may be possible that a window picture that is not extracted by tracking is extracted as a window picture in static extraction. Thus, the static extraction window picture is extracted independently in each environment.

Similarly, window pictures are extracted by static extraction for each intermediate picture. It is assumed that window pictures: E1(An), E2(An), . . . , E12(An) are statically (i.e., independently) extracted from the registered picture A(n), and 12 window pictures are extracted.

The fourth stage in FIG. 1 schematically shows a collection of robust window picture 130. The first principle of extracting a robust window picture in the example in FIG. 1 is to select a window picture extracted as a common window picture in the tracking window picture 110 and the static extraction window picture 120. In other words, a window picture of a site selected both in window picture extraction by tracking (first window picture selection standard) and in window picture extraction by static extraction (second window picture selection standard) under the conditions of the environmental variations, i.e., a window picture selected, irrespective of the variations in a capturing environment from the capturing environment of the basic registered picture, is selected as a robust window picture.

In the example shown in FIG. 1, 10 window pictures: F1(A1), F2(A1), F10(A1) are selected from the registered picture A(1). Nine window pictures: G1(A2), G2(A2), . . . , G9(A2) are selected in the registered picture A(2). Eight window pictures: H2(An), H2(An), . . . , H8(An) are selected in the registered picture A(n).

Figure 2:
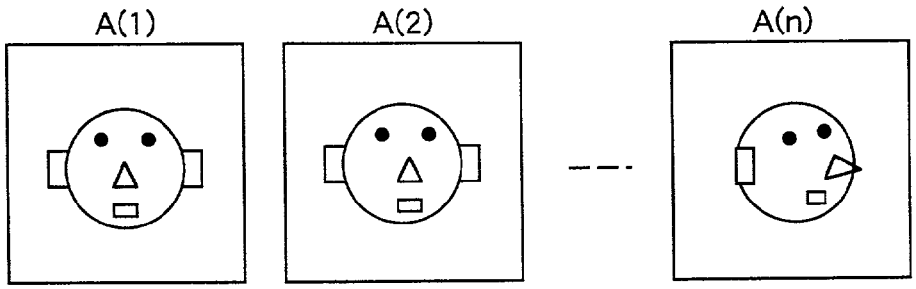
FIG. 2 shows an exemplary principle of extracting a robust window picture in another pattern used in the picture matching processing system of the present invention.
Figure 2:
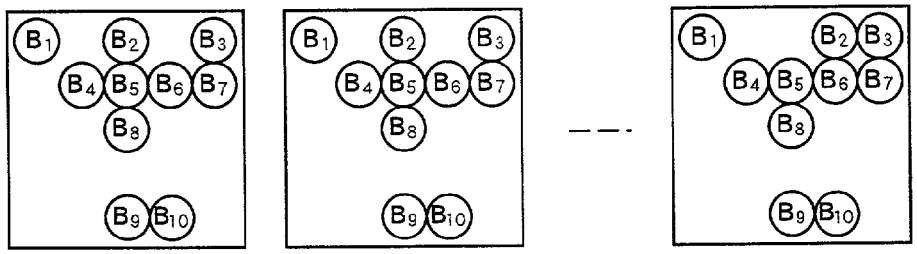
Figure 2:
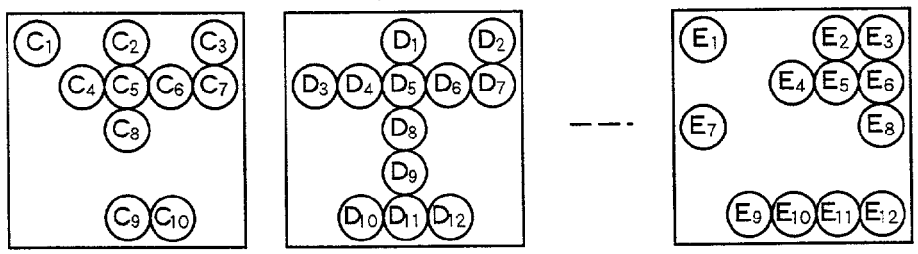
Figure 2:
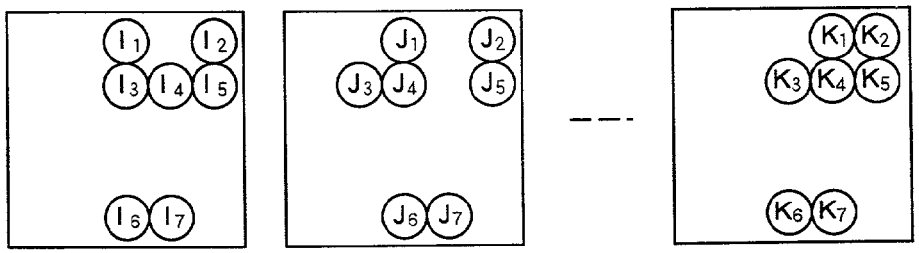

Next, FIG. 2 shows an example of a second principle of extracting a robust window picture in another pattern.

The first stage in FIG. 2 shows a registered picture group 100, which is the same as that in FIG. 1. The registered picture group 100 includes a series of pictures in which a posture is changed continuously at a predetermined interval, and includes n pictures: a registered picture A(1), a registered picture A(2), . . . , a registered picture A(n) from the left side. For convenience, the first registered picture A(1) is also prescribed as a basic registered picture.

The second stage in FIG. 2 shows a tracking window picture group 110, which is the same as that in FIG. 1. In the example in FIG. 2, 10 window pictures: B1(A1), B2(A1), . . . , B10(A1) are extracted from the basic registered picture A(1). In the registered picture A(2), window pictures: B1(A2), B2(A2), . . . , B10(A2) are extracted as a result of tracking from the registered picture A(1). In the registered picture A(n), window pictures B1(An), B2(An), . . . , B10(An) are extracted as a result of tracking from the registered pictures: A(1), A(2), . . . , A(n−1).

The third stage in FIG. 2 shows a static extraction window picture 120, which is the same as that in FIG. 1. Ten window pictures C1(A1), C2(A1), . . . , C10(A1) are extracted from the basic registered picture A(1), 12 window pictures: D1(A2), D2(A2), . . . , D12(A2) are extracted statically (i.e., independently) from the registered picture A(2), and 12 window pictures: D1(An), D2(An), . . . , D12(An) are extracted statically (i.e., independently) from the registered picture A(n).

The fourth stage in FIG. 2 schematically shows a robust window picture set 140. The second principle of extracting a robust window picture set is to select a window picture set and extract a window picture commonly selected among the tracking window picture 110 and the static extraction window picture 120. In other words, a window picture set of the same site selected in all the variations in an environment both in window picture extraction by tracking (first window picture selection standard) and in window picture extraction by static extraction (second window picture selection standard) becomes a robust window picture. According to the first principle of extracting a robust widow picture shown in FIG. 1, a window picture that is robust against the variations in a capturing environment with respect to the capturing environment of the basic registered picture is selected independently for each registered picture. According to the second principle of extracting a robust window picture shown in FIG. 2, a window picture set of the same site that is robust against all the variations in a capturing environment with respect to the capturing environment of the basic registered picture is selected by a unit of set.

In the example in FIG. 2, seven window picture groups are selected as a robust window picture group. In the registered picture A(1), I1(A1), I2(A1), . . . , I7(A1) are selected. In the registered picture A(2), J1(A2), J2(A2), . . . , J7(A2) are selected. In the registered picture A(n), K1(An), K2(An), . . . , K7(An) are selected.

More specifically, as for a tracking window picture set $B_1$, there is a corresponding window picture $C_1$ in the statically extracted window picture 120 ($C_1$, . . . , $C_{10}$) of the registered picture A(1). However, there is no corresponding window picture in the statically extracted window picture 120 ($D_1$ to $D_{12}$) of the registered picture A(2). Therefore, the tracking window picture set $B_1$ is not selected as a robust window picture set. As for a tracking window picture set $B_4$, there are corresponding window pictures $C_4$ and $D_4$ in the statically extracted window pictures 120 ($C_1$, . . . , $C_{10}$) and ($D_1$, . . . , $D_{12}$) of the registered pictures A(1) and A(2). However, there is no corresponding window picture in the statically extracted window picture 120 ($E_1$ to $E_{12}$) of the registered picture A(n). Therefore, the tracking window picture set $B_4$ is not selected as a robust window picture set. As for a tracking window picture set $B_8$, there are corresponding window pictures $C_8$ and $D_8$ in the statically extracted window pictures 120 ($C_1, \ldots, C_{10}$) and ($D_1, \ldots, D_{12}$) of the registered pictures A(1) and A(2). However, there is no corresponding window picture in the statically extracted window picture 120 ($E_1$ to $E_{12}$) of the registered picture A(n). Therefore, the tracking window picture set $B_8$ is not selected as a robust window picture set.

As described above, the following effects can be obtained by selecting a robust window picture as a model window picture.

First, as the first effect, picture matching can be conducted, not depending upon the variations in an environment that are assumed to be inputted in the recognition phase. Specifically, satisfactory picture matching can be conducted by matching a window picture extracted from a picture inputted in the recognition phase with a model window picture that is a robust window picture. More specifically, the window picture extracted from the picture inputted in the recognition phase contains a window picture corresponding to the robust picture, and picture matching can be conducted by comparing them with each other.

Next, as the second effect, in the case of large variations in an environment of a picture that are assumed to be inputted in the recognition phase, a picture matching precision can be expected to be enhanced. The window picture other than the robust window picture is a window picture of a site that is likely to be influenced by the variations in an environment. Therefore, if a model window picture containing such a window picture of the site is used, and matched with a window picture extracted from an input picture in the recognition phase, due to the influence of the variations in an environment, non-existing window pictures are increased and a picture matching precision will be deteriorated. According to the present invention, window picture matching is conducted by using only a window picture that is robust against the variations in an environment; therefore, even in the case where the variations in an environment of a picture assumed to be inputted in the recognition phase is large, a picture matching precision can be kept high.

Examples of the principle of extracting a robust window picture have been described above.

Next, a structure and an operation of an apparatus of the picture matching processing system of Embodiment 1 according to the present invention will be described.

Figure 3:
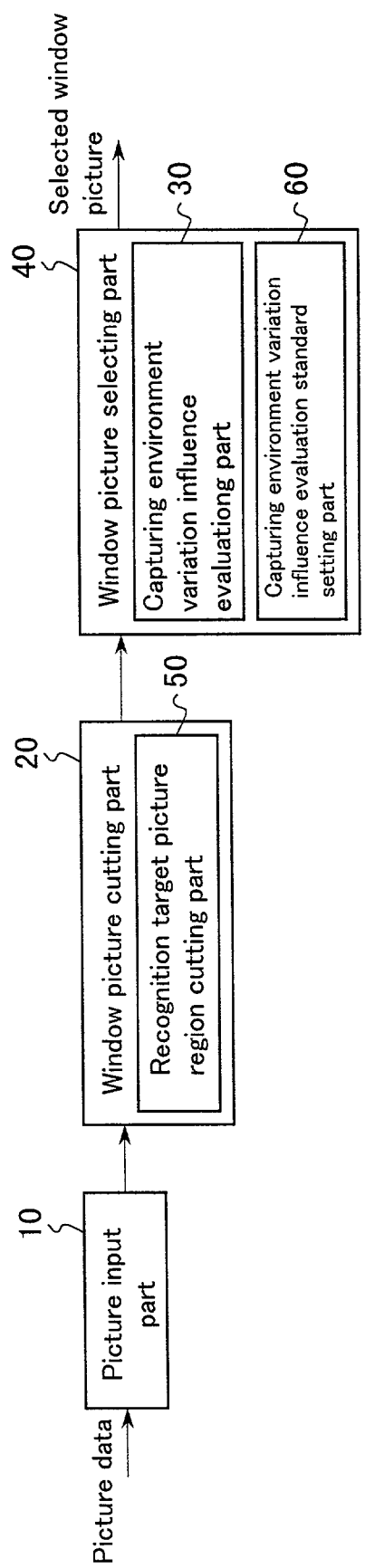
FIG. 3 is a block diagram showing an exemplary basic structure of the picture matching processing system of the present invention.

FIG. 3 is a block diagram showing an exemplary basic structure of the picture matching processing system of the present invention.

Reference numeral 10 denotes a picture input part. The picture input part 10 inputs registered picture data used in a registration phase, and inputs recognition target picture data used in a recognition phase. The picture input part 10 may input picture data file from outside, or may be provided with a camera so as to capture a picture.

Reference 20 denotes a window picture cutting part. The window picture cutting part 20 cuts out a characteristic window picture from the input recognition target picture. The cutting processing can use an algorithm by an Eigen-Window method. Since the input data of the window picture cutting part 20 is a captured picture, it may be provided with a recognition target picture region cutting part 50 for detecting a recognition target picture region such as a face picture region of a person from captured picture and cuts out the recognition target picture region.

Reference numeral 30 denotes a capturing environment variation influence evaluating part, which inputs window picture data cut out by the window picture cutting part 20 and evaluates the influence of the variations in a capturing environment. Various methods for evaluating the influence of the variations in a capturing environment are assumed.

Reference numeral 40 denotes a window picture selecting part. The window picture selecting part 40 selects a window picture, in which the influence of the variations in a capturing environment is at a predetermined level or less, from the cut out window pictures, based on the evaluation results of the influence of the variations in a capturing environment in the capturing environment variation influence evaluating part 30. The window picture selecting part 40 can be provided with a capturing environment variation influence evaluation standard setting part 60 for the purpose of tuning the standard with respect to the influence of the variations in a capturing environment.

Figure 4:
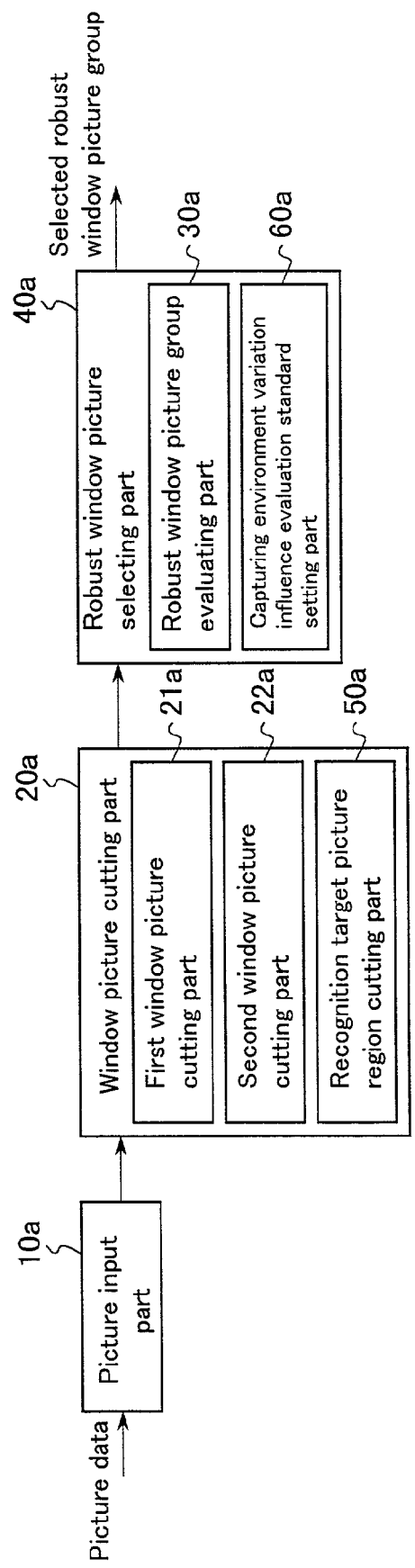
FIG. 4 shows, as one example of FIG. 3, an exemplary structure in the case where a procedure for evaluating the influence of the variations in a capturing environment is a procedure for evaluating whether or not a cut out window picture is a robust window picture.

FIG. 4 shows, as one example of FIG. 3, an exemplary structure in the case where a procedure for evaluating the influence of the variations in a capturing environment is a procedure for evaluating whether or not a cut out window picture is a robust window picture. FIG. 4 shows an exemplary structure of an apparatus corresponding to the basic principle shown in FIG. 1.

A picture input part 10a inputs a plurality of recognition target pictures in different capturing environments, and organizes them as a picture group.

A window picture cutting part 20a has a first window picture cutting part 21a and a second window picture cutting part 22a for handling the difference in cutting processing. The first window picture cutting part 21a cuts out a characteristic local region, based on the first standard in which the variations in a capturing environment are not considered. In the present example, it is assumed that the first standard is a standard for cutting out a window picture by tracking each site of a recognition target in a series of pictures of the picture group described in the basic principle. The second window picture cutting part 22a cuts out a characteristics local region from each recognition target picture of the picture group, based on the second standard in which the variations in a capturing environment are considered. In the present example, it is assumed that the second standard is a standard for cutting out a characteristic window picture, as an independent picture, from each picture of the picture group described in the basic principle.

A robust window picture evaluating part 30a corresponds to the capturing environment variation influence evaluating part 30, which determines a window picture contained both in the first window picture cut out by the first window picture cutting part 21a and in the second window picture cut out by the second window picture cutting part 22a, as a robust window picture.

The robust window picture selecting part 40a extracts and selects a window picture evaluated as a robust window picture by evaluation of the robust window picture evaluating part 30a.

Figure 5:
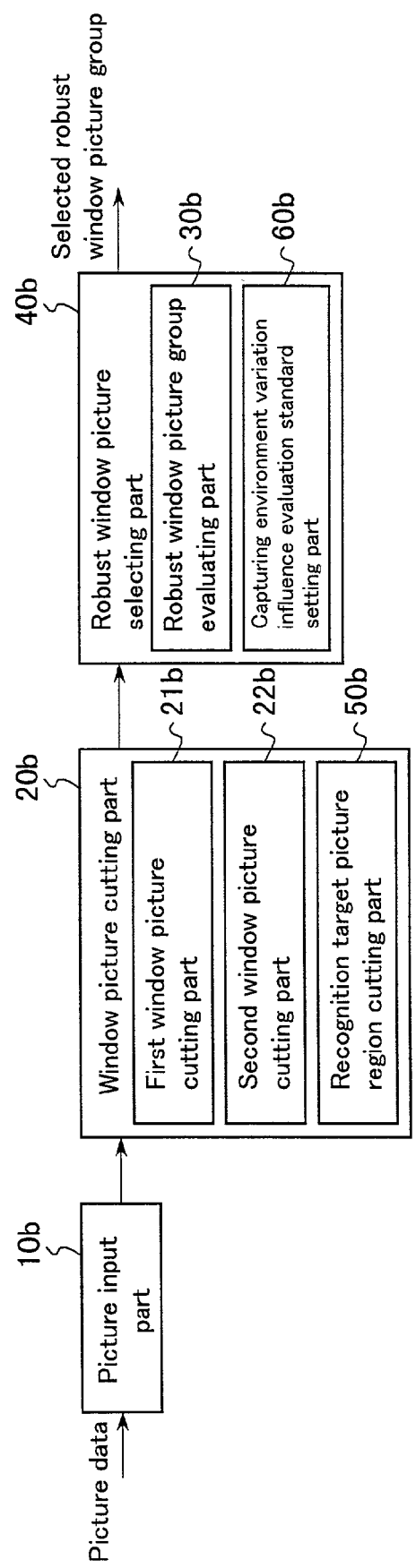
FIG. 5 shows, as another example of FIG. 3, an exemplary structure in the case where a procedure for evaluating the influence of the variations in a capturing environment is a procedure for evaluating whether or not the window picture set may be the robust window picture set.

FIG. 5 shows, as another example of FIG. 3, an exemplary structure in the case where a procedure for evaluating the influence of the variations in a capturing environment is a procedure for organizing cut out window pictures for the same site as that of window picture sets, and evaluating whether or not the window picture set may be the robust window picture set. This is an exemplary structure of an apparatus corresponding to the basic principle shown in FIG. 2.

A picture input part 10b corresponds to the picture input part 10a in FIG. 4, and inputs a plurality of recognition target pictures in different capturing environments and organizes them as a picture group. A window picture cutting part 20b corresponds to the window picture cutting part 20a in FIG. 4. The window picture cutting part 20b has a first window picture cutting part 21b and a second window picture cutting part 22b for handling the difference in cutting processing.

A robust window picture set evaluating part 30b corresponds to the capturing environment variation influence evaluating part 30. The robust window picture set evaluating part 30b sets window pictures corresponding to each other in the same site of a recognition target as a window picture set, among the window pictures cut out from the first window picture cut out by the first window picture cutting part 21b, and in the case where each window picture belonging to the window picture set is contained both in the first window picture cut out based on the first standard and in the second window picture cut out based on the second standard, evaluates the above-mentioned window picture set as a robust window picture set.

A robust window picture set selecting part 40b extracts and selects a window picture set evaluated as a robust window picture set by evaluation of the robust window picture set evaluating part 30b.

Hereinafter, an exemplary operation of the picture matching processing system of Embodiment 1 according to the present invention will be described with reference to FIGS. 6 and 7. Herein, an operation will be described in the case of an exemplary structure of an apparatus shown in FIG. 5.

First, the picture input part 10b inputs picture data of a person to be a registered target captured in a certain capturing environment (Operation 601).

The picture input part 10b confirms whether or not a plurality of picture data in predetermined different capturing environments have been captured (Operation 602). In the case where the predetermined picture data have not been captured (Operation 602: N), the picture input part 10b changes the capturing environment of the picture data captured in Operation 601 (Operation 603), thereby capturing picture data of a person to be a registered target (returns to Operation 601). When the capturing environment is changed, it is preferable that capturing environment parameters are changed at a predetermined standard and interval to obtain a series of pictures in which a capturing environment is changed, rather than changing the capturing environment randomly. Herein, it is assumed that a capturing environment such as the front face of a person and the relative position between the person and the camera are changed, and a series of pictures in which the person turns his/her face from the front to the right. Reference numeral 701 in FIG. 7 schematically shows a captured series of pictures.

Next, the first window picture cutting part 21b of the window picture cutting part 20b extracts a tracking window picture. First, a window picture that is a characteristic local region is cut out from the basic registered picture (Operation 604). Reference numeral 702 in FIG. 7 schematically shows this state. Then, the positions of the sites corresponding to the respective sites in the window picture cut out from the basic registered picture, in the remaining series of pictures, are obtained by tracking (Operation 605). Reference numeral 703 in FIG. 7 schematically shows a state in which window pictures with respect to the site of the right eye are being tracked. Reference numeral 704 in FIG. 7 schematically shows tracking window picture sets of the sites of the right eye and the mouth as cut out tracking window picture sets.

Next, regarding each picture, the second window picture cutting part 22b of the window picture cutting part 20b cuts out a window picture by static extraction (Operation 606). Reference numeral 705 in FIG. 7 schematically shows the center of each window picture selected by static extraction from each picture, using a black circle.

The robust window picture set evaluating part 30b sets window pictures corresponding to each other in the same site of the recognition target as a tracking window picture set, among the window pictures cut out from the first window picture cut out by the first window picture cutting part 21b, and evaluates whether or not the tracking window picture group is a robust window picture, based on whether or not each window picture belonging to the tracking window picture set is also selected as a static extraction window picture (Operation 607).

The robust window picture group selecting part 40b extracts and selects a window picture set evaluated as a robust window picture set by evaluation of the robust window set evaluating part 30b (Operation 608). Reference numeral 706 in FIG. 7 schematically shows a state in which the window picture set of the right eye is selected as a robust window set.

It is checked if there are any tracking window picture group that has not been evaluated (Operation 609). If there are any tracking window picture set that has not been evaluated (Operation 609: Y), the process returns to Operation 607 to continue determination processing of a robust window set. If there are not any tracking window picture set that has not been evaluated (Operation 609: N), the process is ended.

The selected robust window set is generated as a model window picture, and a registration phase is ended.

In a recognition phase, the window picture of the captured recognition picture is matched with the model widow picture generated from the robust window set.

According to the picture matching processing system of Embodiment 1, by selecting a robust window picture and using it for picture matching processing, picture matching processing with high robustness can be conducted even when the capturing environment is varied.

Embodiment 2

The basic principle, structure, and operation of a picture matching system using a stable window picture will be described.

First, the principle of extracting a stable window picture in which a feature value is less varied depending upon the variations in an environment, used in the picture matching processing system of the present invention, will be described.

Figure 8:
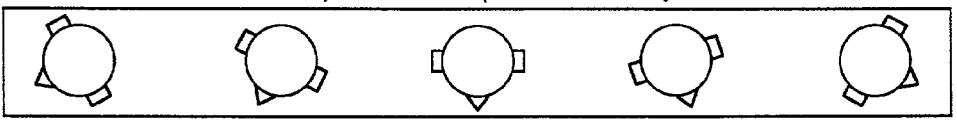
FIG. 8 schematically illustrates a principle of extracting a stable window picture set used in the picture matching processing system of the present invention.
Figure 8:
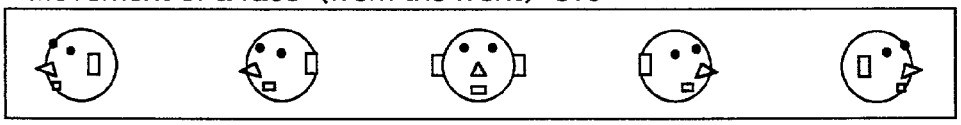
Figure 8:
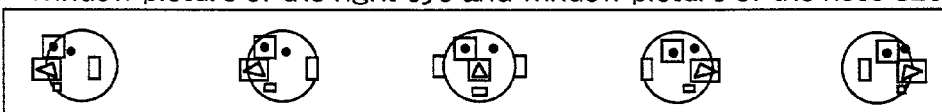
Figure 8:
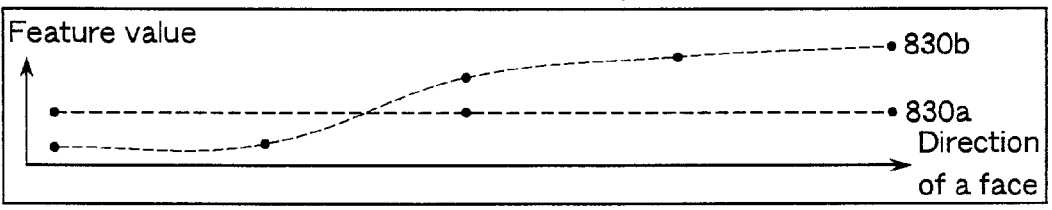

FIG. 8 schematically illustrates the principle of extracting a stable window picture.

An example of a series of pictures in which a capturing environment is varied will be described. In this example, a person to be a registered target has turned his/her face from the right to the left. In FIG. 8, the first stage 800 schematically shows this state from the top of the head, and the second stage 810 schematically shows this state from the front.

First, a window picture is cut out from each picture by static extraction described in Embodiment 1. As a result, window pictures of a number of sites are cut out. Herein, for simplicity of description, the description will be made using a window picture of the site of the right eye and a window picture of the site of the nose as denoted by reference numeral 820.

According to cutting out of a window picture by static extraction, a characteristic local region of a picture is cut out as described in the prior art and Embodiment 1, and each window picture has a feature value (i.e., a feature parameter). As an example, a window picture having about 225 dimensions (which may be varied depending upon the definition of parameters) is compressed to a picture having about 20 dimensions, whereby the window picture is projected as points in a 20-dimensional eigen space. Each window picture has projection points in the eigen space. Briefly, the principle of extracting a stable window picture is to extract a stable window picture, in which a projection point group in the eigen space of each window picture of a window picture set collected based on the same site in the recognition picture is in a predetermined range and is less varied. This means that the changes in a feature value are within a predetermined standard. Reference numeral 830 in FIG. 8 briefly represents changes in a feature value. The vertical axis represents a feature value, and a horizontal axis represents variations in a capturing environment of each picture (herein, it is assumed that the capturing environment is a face angle of a person). Reference numeral 830*a* denotes changes in a feature value of a window picture of the eye, and 830*b* denotes changes in a feature value of a window picture of the nose. As can be seen from reference numerals 830*a* and 830*b*, the changes in a feature value of the window picture of the eye are small, whereas the changes in a feature value of the window picture of the nose are large. The changes in a feature value may be changes in appearance of a window picture. It is understood that a characteristic shape of the window picture of the eye is not substantially changed as denoted by reference numeral 810, but a characteristic shape of the window picture of the nose is substantially changed as denoted by reference numeral 810. Therefore, the changes in a feature value of the window picture of the eye become small, whereas the changes in a feature value of the window picture of the nose become large.

If the standard for evaluating a stable window picture is set so that the changes in a feature value are in a predetermined range, evaluation is made possible that the window picture of the eye is prescribed as a stable window picture, and the window picture of the nose is not prescribed as a stable window picture.

Regarding the window picture of the eye, a high picture matching precision can be expected in any face direction as long as it is in a range denoted by reference numeral 810. On the other hand, regarding the window picture of the nose, a picture matching precision will be fluctuated depending upon the face direction. Assuming that the window picture of the nose is a part of a model picture, an entire picture matching precision may be decreased.

The principle of extracting a stable window picture has described above.

Next, the technique of reducing a processing amount in stable window picture extraction will be described.

In the stable window picture extraction, as described in the principle of extracting a stable window picture, each window picture is extracted from each picture by static extraction, and a feature value of each window picture of a window picture set collected based on the same site in the recognition picture is calculated, whereby a projection point group in an eigen space having the feature value parameter as a dimension is obtained. If the projection points in the eigen space of all the obtained window pictures are obtained, it can be determined whether or not a window picture of each site is a stable window picture. However, calculation of a feature value (e.g., originally 225 dimensions), calculation of feature value compression (e.g., 20 dimensions), and projection processing in an eigen space are conducted with respect to all the window pictures of all the pictures, which results in a large processing amount. Therefore, the stable window picture extraction processing amount is reduced as follows.

Figure 9:
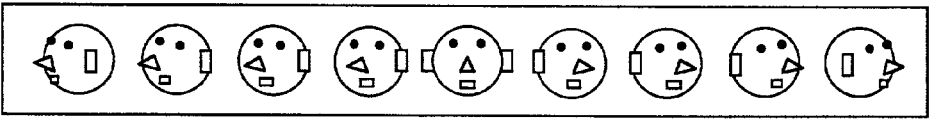
FIG. 9 schematically shows a method for reducing a processing amount of stable window picture extraction.
Figure 9:
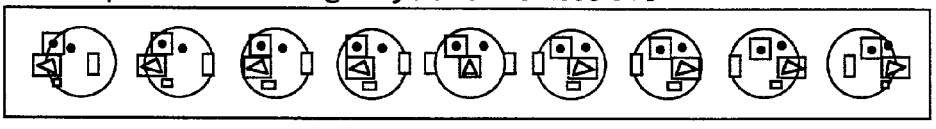
Figure 9:
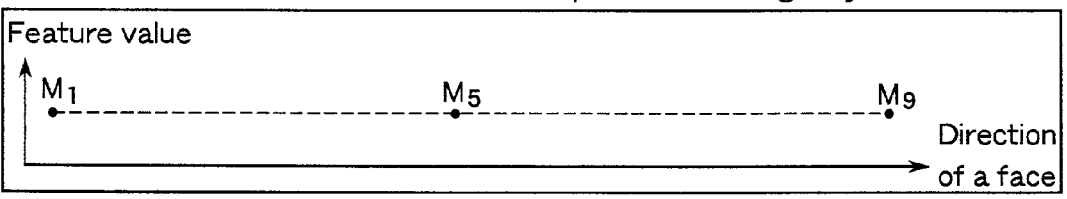
Figure 9:
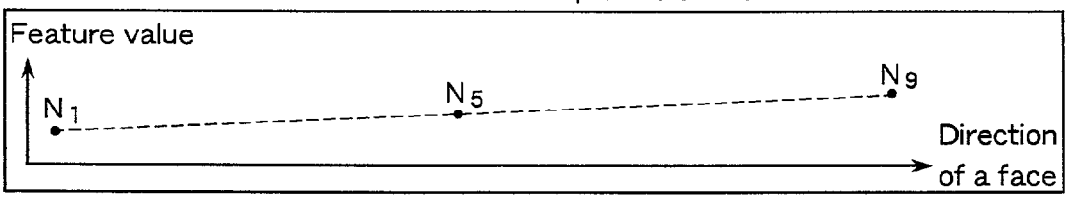
Figure 9:
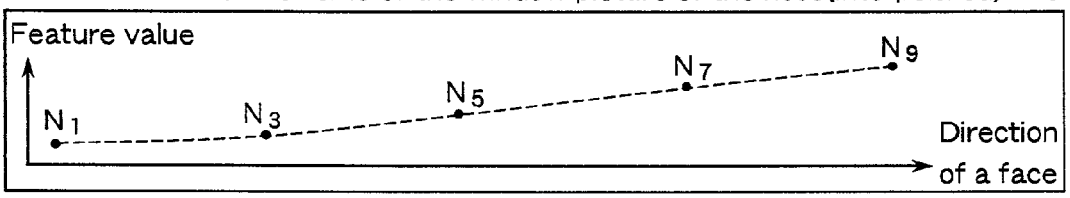
Figure 9:
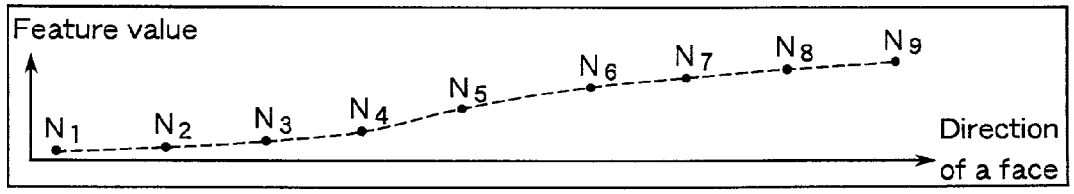

FIG. 9 schematically shows a method for reducing a stable window picture extraction processing amount.

The first stage 900 in FIG. 9 shows each registered picture. Herein, there are 9 series of pictures in which a face is turned from the right to the left.

The second stage 910 shows a statically extracted window picture set (L1 to L9 from the left). For convenience of description, only a window picture set of the right eye and a window picture set of the nose are shown.

The third stage 920 calculates a feature value regarding the window picture of the right eye, thereby obtaining a projection point group in an eigen space having the feature value parameter as a dimension. Herein, projection is conducted in the following order. First, a projection point M1 is obtained by projecting the window picture of the right eye of the window picture group L1 obtained from the first picture of a series of pictures onto a feature space. Then, a projection point M9 is obtained by projecting the window picture of the right eye of the window picture group L9 obtained from the last picture of a series of pictures onto a feature space. A projection point M5 is obtained by projecting a window picture of the right eye of the window picture group L5 in the middle of a series of pictures onto a feature space. It is understood that the difference in a feature value is small between three projection points M1, M9, and M5. In this case, since the difference in a feature value is small between the first, middle and last pictures in a series of pictures, it is sufficiently expected that the changes in a feature value are small over a series of pictures. Therefore, the window picture of the right eye is determined as a stable window picture as a result of the projection processing of three window pictures, and the stable window picture determination processing may be ended.

In the case where it is desired to obtain a feature value projection track of the window picture of the right eye over a series of pictures, such a track may be estimated by connecting three projection points M1, M5, and M9 to each other, as represented by reference numeral 920.

Next, the fourth stage 930 calculates a feature value regarding the window picture of the nose, thereby obtaining a projection point group in an eigen space having the feature value parameter as a dimension. Herein, projection is conducted in the following order. In the same way as in the window picture of the eye, first, a projection point N1 is obtained by projecting a window picture of the nose of the window picture group L1 obtained from the first picture of a series of pictures onto a feature space. Then, a projection point N9 is obtained by projecting a window picture of the nose of the window picture group L9 obtained from the last picture of a series of pictures onto a feature space. A projection point N5 is obtained by projecting a window picture of the nose of the window picture group L5 in the middle of a series of pictures onto a feature space. It is understood that the difference in a feature value is large between three projection points N1, N9, and N5. In this case, although it is not known how a feature value of the window picture in the remaining pictures of a series of pictures are varied, it is clear that the difference is large as a whole. Therefore, it is determined that the window picture of the nose is not a stable window picture as a result of projection processing of three window pictures, and the stable window picture determination processing may be ended.

Even in the case where it is desired to obtain a feature value projection track of the window picture of the nose over a series of pictures, it is unclear how to connect three projection points N1, N5, and N9 to each other. Therefore, a projection track between these three projection points N1, N5, and N9 is obtained in accordance with a required precision.

The fourth stage 930 shows the simplest estimated track. In this case, three projection points N1, N5, and N9 are merely connected to each other.

In the fifth stage 940, feature value projection point processing is conducted with respect to the intermediate window pictures L3 and L7 of the nose of a series of pictures, and the obtained projection points are interpolated between the projection points N1 and N5 and between the projection points N5 and N9. Herein, it is assumed that projection points N3 and N7 are obtained. Five projection points N1, N3, N5, N7, and N9 are connected to each other to estimate an intermediate track.

In the sixth stage 950, in the case where a further precision is required, feature value projection point processing of the window pictures is conducted with respect to other intermediate window pictures of a series of pictures, and the obtained projection points are interpolated in the track obtained in the fifth stage 940. It is assumed that feature value projection point processing is conducted with respect to the intermediate window pictures L2, L4, L6, and L8 of the nose of a series of pictures, and projection points N2, N4, N6, and N8 are obtained. In this case, 9 projection points N1 to N9 are connected to each other to estimate an intermediate track.

As described above, by obtaining an intermediate projection track in accordance with a required precision, projection processing can be optimally reduced.

The basic principle of a method for reducing a stable window picture extraction processing amount has been described above.

Next, a structure and an operation of an apparatus of the picture matching processing system of Embodiment 2 according to the present invention will be described.

An exemplary basic structure of the picture matching processing system of the present invention described in Embodiment 1 with reference to FIG. 3 is the same as that in Embodiment 2. Therefore, the description thereof will be omitted here.

Figure 10:
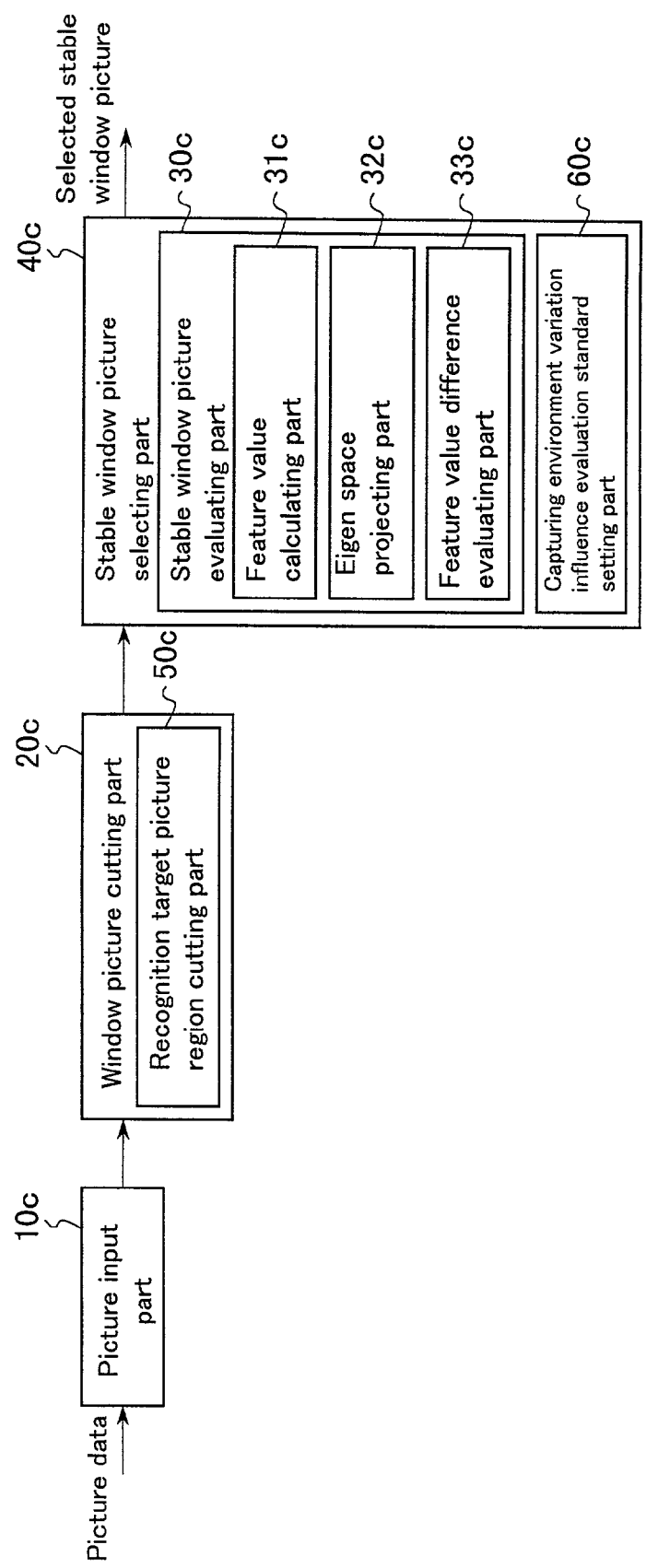
FIG. 10 shows, as another example of FIG. 3, an exemplary structure in the case where a procedure for evaluating the influence of the variations in a capturing environment is a procedure for evaluating whether or not a cut out window picture set is a stable window picture set.

FIG. 10 shows, as one example of FIG. 3, an exemplary structure in which a procedure for evaluating the influence of the variations in a capturing environment is a procedure for evaluating whether or not a cut out window picture is a stable window picture.

A picture input part 10c inputs a plurality of recognition target pictures in different capturing environments to organize them as a picture group.

A window picture cutting part 20c cuts out a characteristic local region from a picture as a window picture by static extraction.

A stable window picture evaluating part 30c corresponds to the capturing environment influence evaluating part 30. The stable window picture evaluating part 30c includes a feature value calculating part 31c, an eigen space projecting part 32c, and a feature value difference evaluating part 33c. First, the capturing environment variation influence evaluating part 30c organizes, as a window picture set, window pictures corresponding to each other in the same site of a recognition target from captured window pictures. Then, the feature value calculating part 31c calculates a feature value of each window picture, and the eigen space projecting part 32c obtains projection points of each window picture in accordance with the feature value. Further, the feature value difference evaluating part 33c evaluates whether or not the difference in a feature value of each window picture belonging to a window picture group is in a predetermined threshold value. The stable window picture evaluating part 30c evaluates that the window picture is a stable window picture when the difference in a feature value is within a predetermined threshold value, and evaluates that the window picture is not a stable window picture when the difference in a feature value is not within a predetermined threshold value.

A stable window picture selecting part 40c extracts and selects a window picture group evaluated as a stable window picture group as a result of evaluation by the stable window picture evaluating part 30c.

Next, an exemplary operation of the picture matching processing system of Embodiment 2 according to the present invention will be described with reference to a flow chart in FIG. 11.

Figure 6:
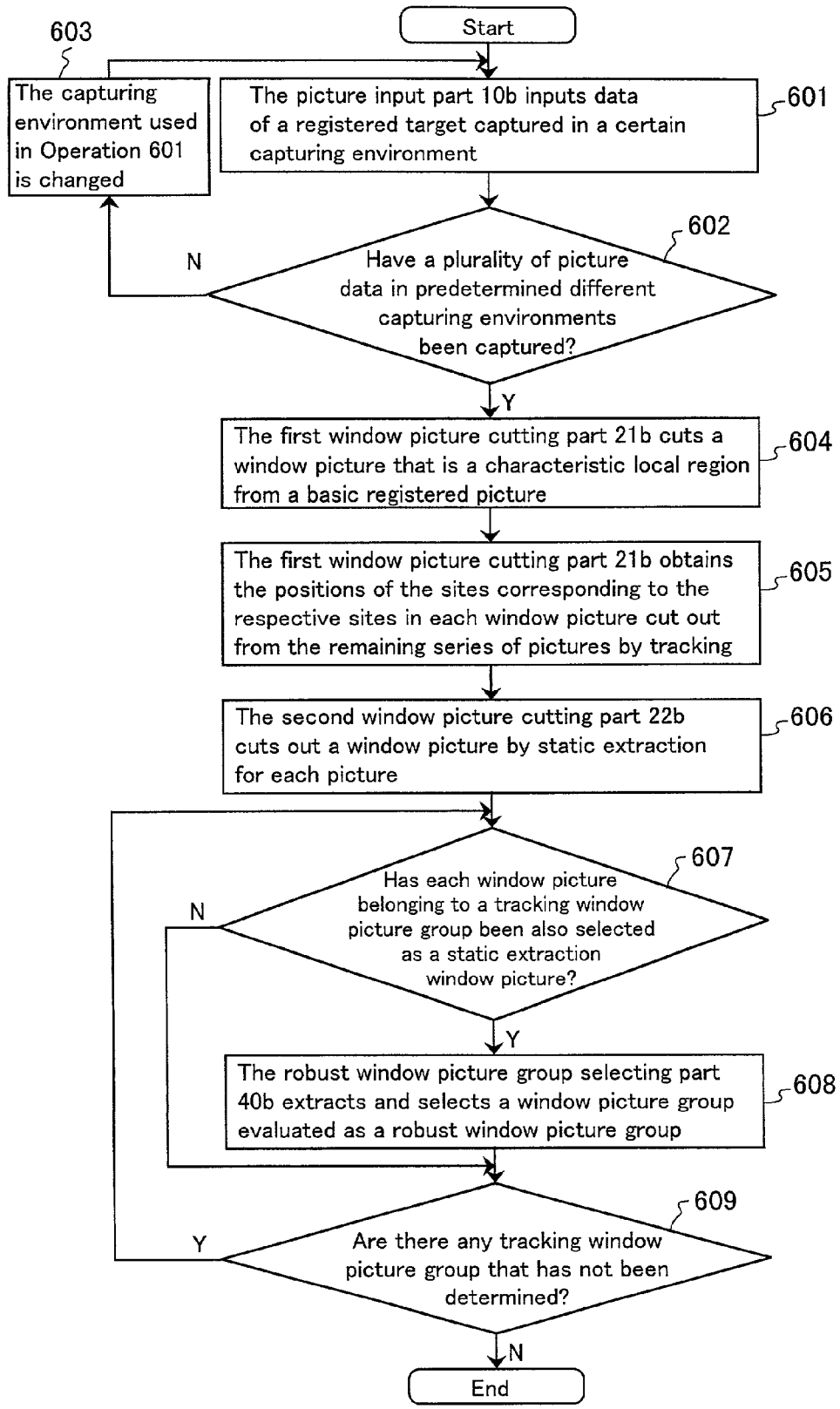
FIG. 6 is a flow chart showing an exemplary operation of a picture matching processing system of Embodiment 1 according to the present invention.
Figure 7:
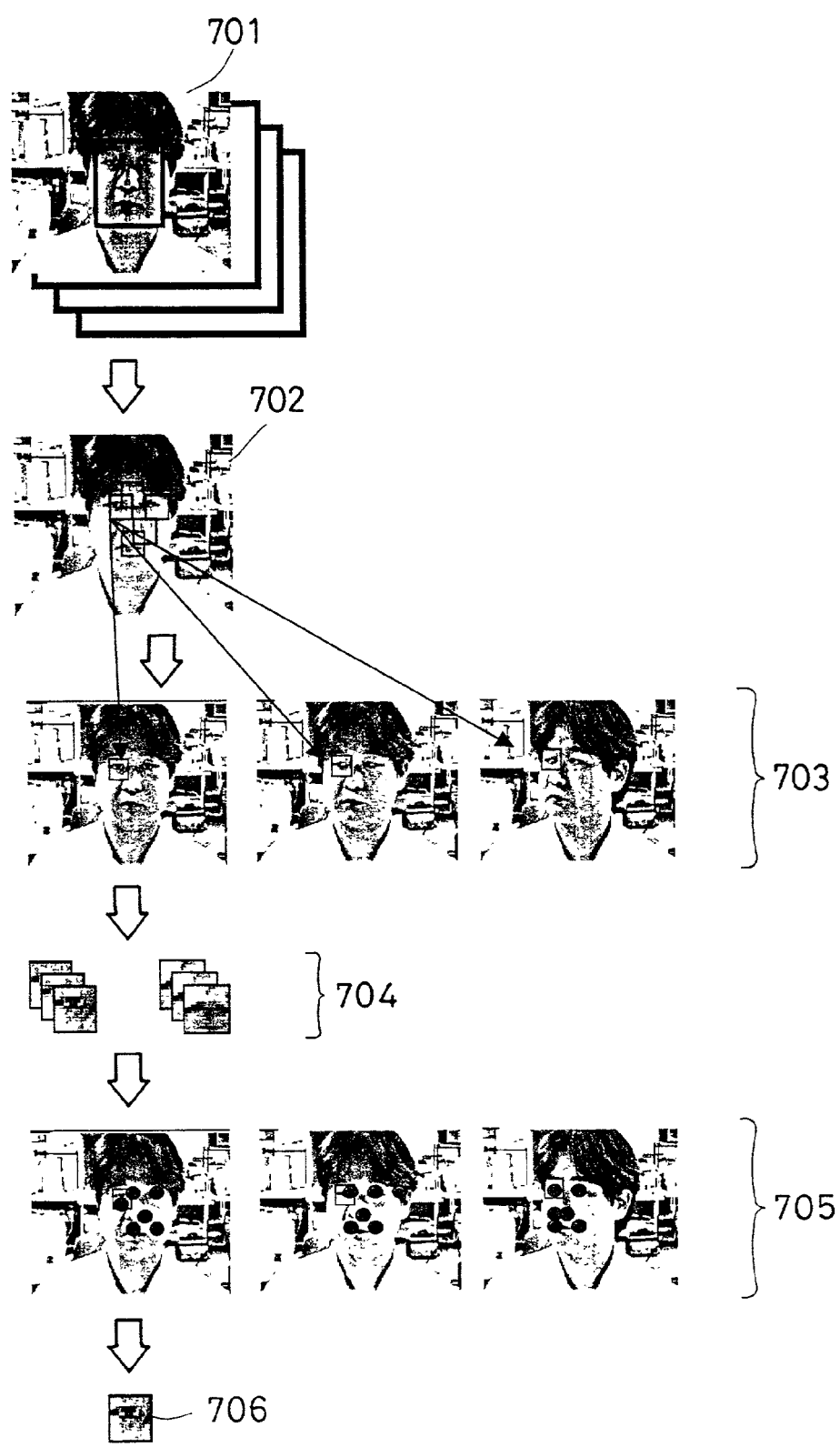
FIG. 7 is a diagram showing an exemplary operation of the picture matching processing system of Embodiment 1 according to the present invention.
Figure 11:
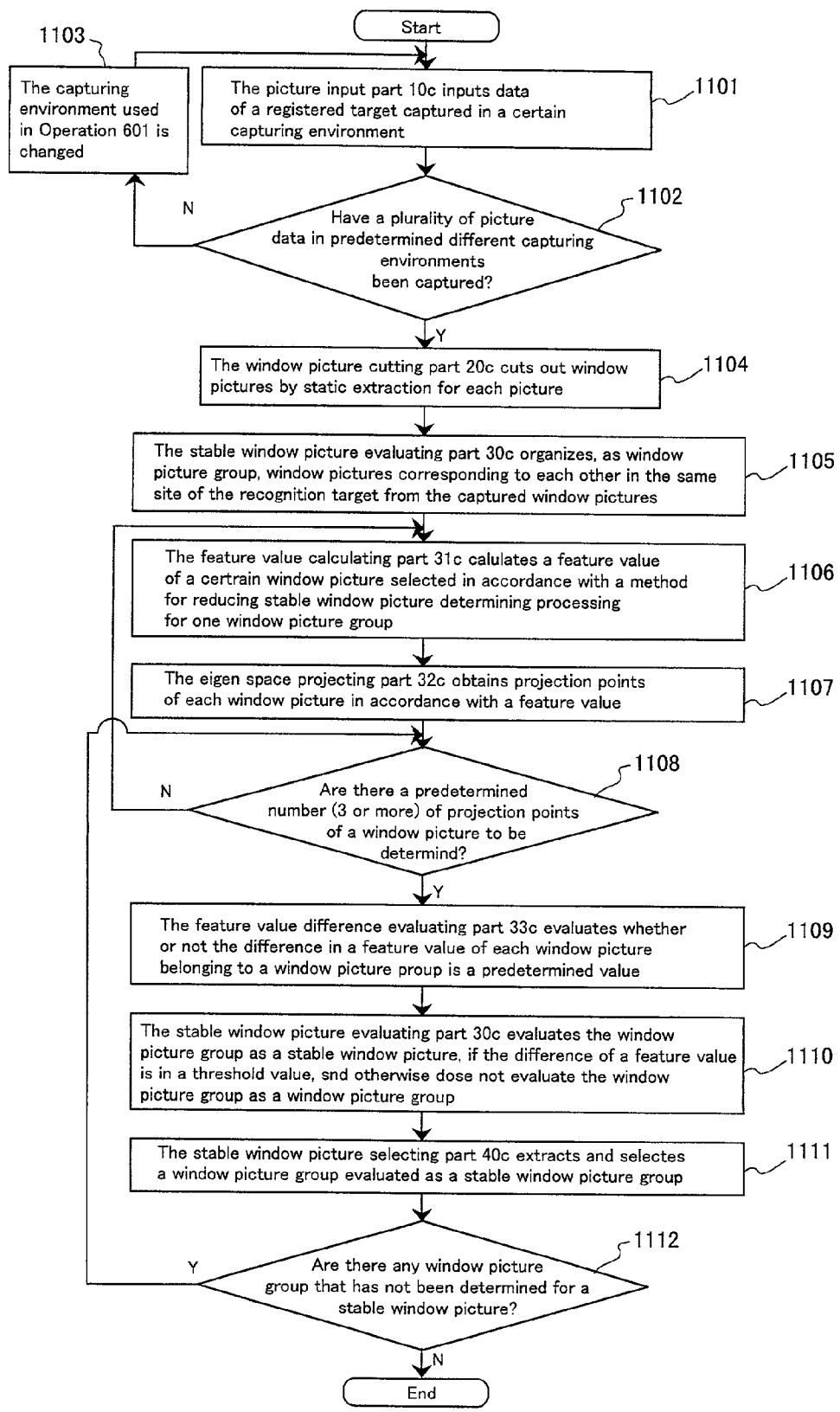
FIG. 11 is a flow chart showing an exemplary operation of a picture matching processing system of Embodiment 2 according to the present invention.

Operations 1101 to 1103 in FIG. 11 are the same as Operations 601 to 603 in FIG. 6. Therefore, the description thereof will be omitted here.

Next, regarding each picture, the window picture cutting part 20c cuts out a window picture by static extraction (Operation 1104).

The stable window picture evaluating part 30c organizes, as a window picture set, window pictures corresponding to each other in the same site of a recognition target from the captured window pictures (Operation 1105).

The feature value calculating part 31c calculates a feature value of each selected window picture (Operation 1106). In this example, by applying the method for reducing stable window picture determining processing, window pictures are selected. More specifically, in the processing loop from Operations 1106 to 1108, feature values are calculated from window pictures selected in the order: the first picture of a series of pictures, the last picture of a series of pictures, and the middle picture of a series of pictures.

Next, the eigen space projecting part 32c obtains projection points of each window picture in accordance with a feature value (Operation 1107).

The stable window picture evaluating part 30c confirms whether or not a predetermined number (e.g., 3 or more) of projection points of a window picture have already been projected after the previous Operation 1107 (Operation 1108). If at least three projection points have already been projected (Operation 1108: Y), the feature value difference evaluating part 33c evaluates the difference in each feature value, and evaluates whether or not the difference in a feature value of each window picture belonging to a window picture set is within a predetermined threshold value (Operation 1109).

The stable window picture evaluating part 30c evaluates the window picture set as a stable window picture, if the difference in a feature value is within a predetermined threshold value, and evaluates that the window picture group is not a stable window picture, if the difference in a feature value is not within a predetermined threshold value (Operation 1110).

The stable window picture selecting part 40c extracts and selects a window picture group evaluated as a stable window picture set by evaluation of the stable widow picture evaluating part 30c (Operation 1111).

The stable window picture evaluating part 30c checks if there are any window picture set that has not been subjected to determination for a stable window picture (Operation 1112). If there are any such window picture set (Operation 1112: Y), the process returns to Operation 1106. If there are not any such window picture set, the selection processing is ended.

The selected stable window picture is generated as a model window picture, and a registration phase is ended.

In the recognition phase, a window picture of the captured recognition picture is matched with a model window picture generated from a stable window picture.

As described above, according to the picture matching processing system of Embodiment 2, a stable window picture is selected, and model window picture data can be generated. By setting a stable widow picture as model window picture data, the volume of model data to be registered as a model is reduced, and picture matching processing can be conducted without being influenced by the variations in a capturing environment at a predetermined picture matching precision, even when the volume of model data is small.

Embodiment 3

Figure 12:
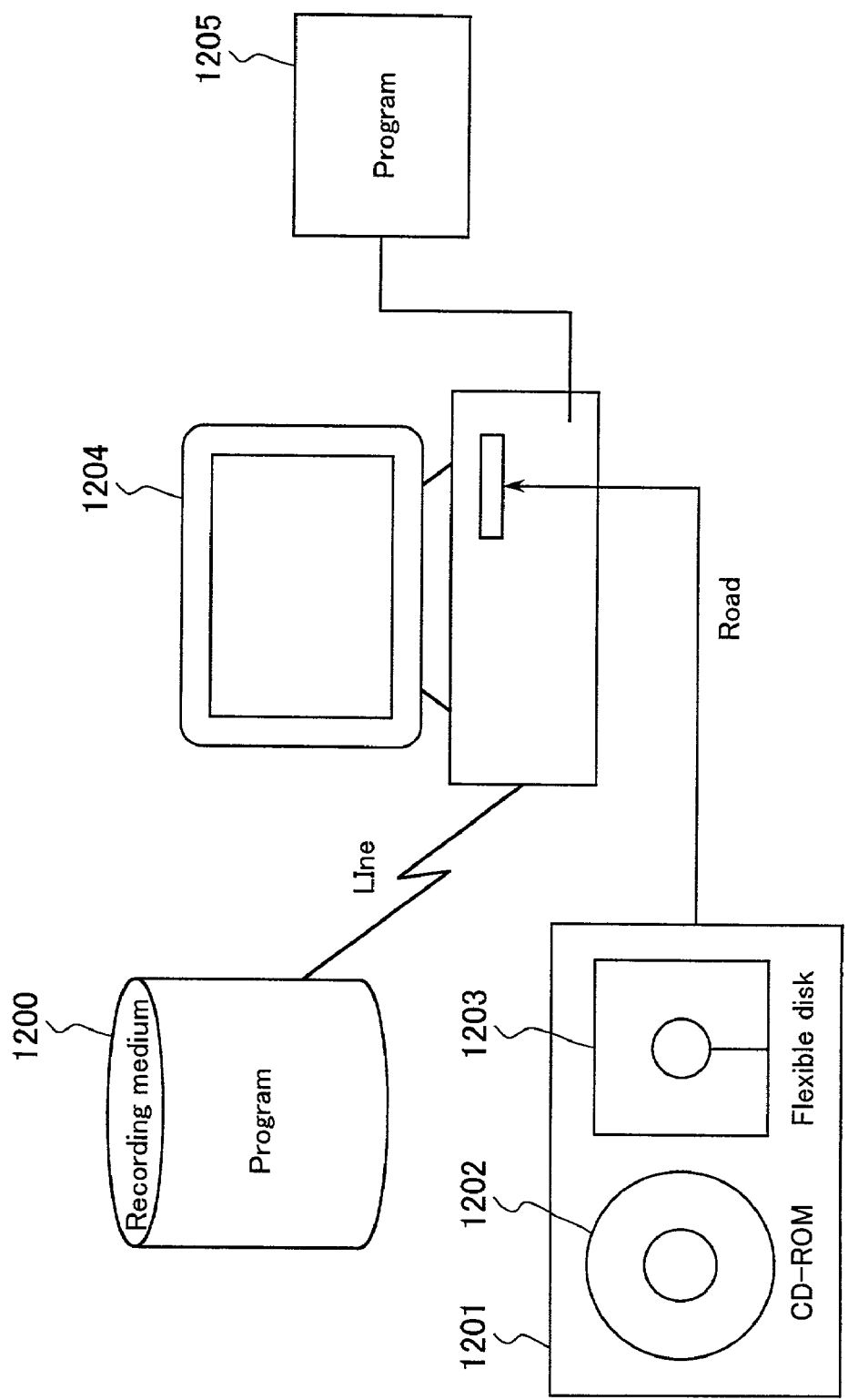
FIG. 12 illustrates exemplary recording media storing a processing program for realizing a picture matching processing system of Embodiment 3 according to the present invention.
Figure 13:
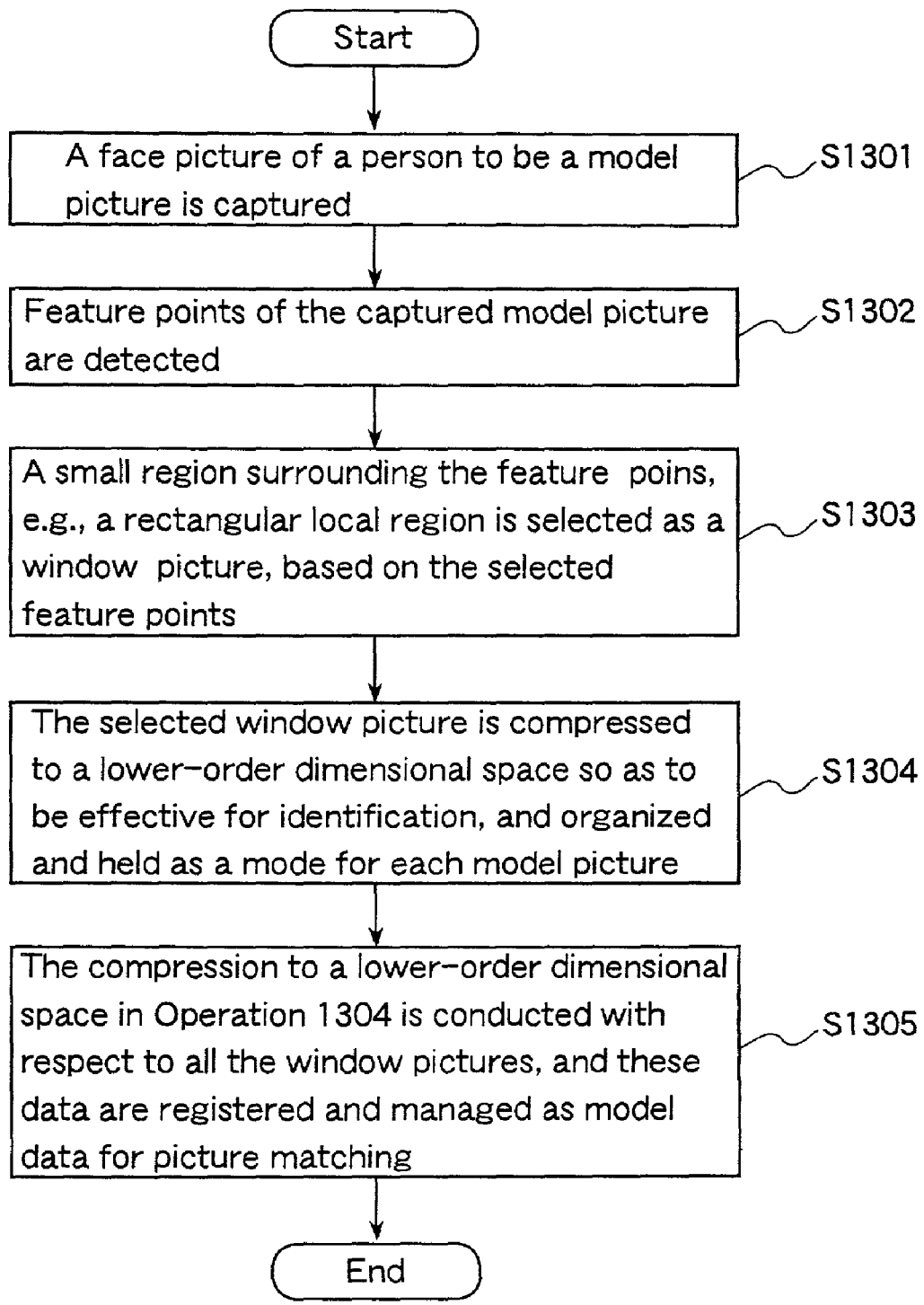
FIG. 13 is a flow chart showing a procedure of "registration phase" processing in an improved Eigen-Window method.
Figure 14:
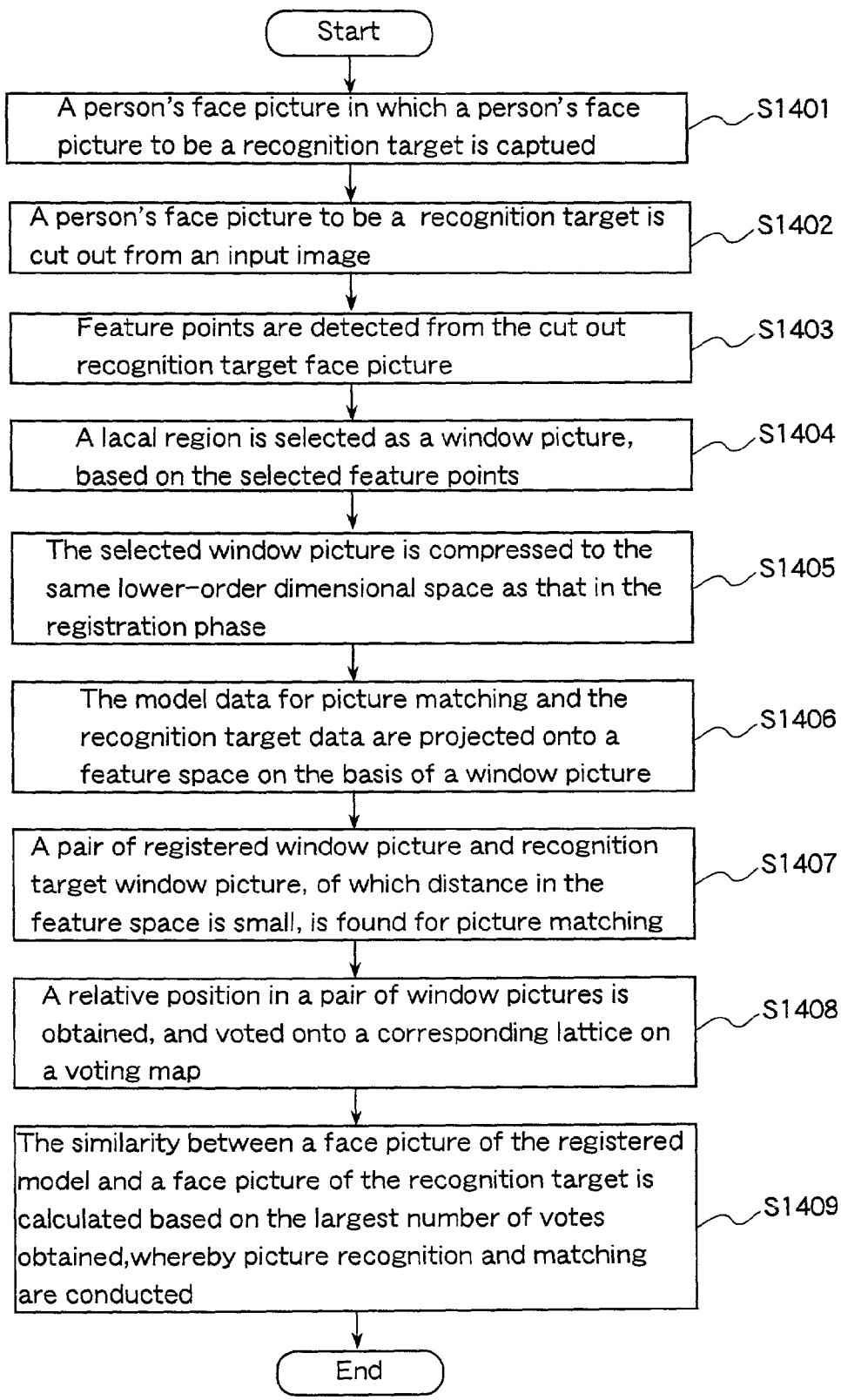
FIG. 14 is flow chart showing a procedure of "recognition phase" processing in an improved Eigen-Window method.
Figure 15A:
FIG. 15A shows an example of a captured model picture.
Figure 15B:
FIG. 15B shows an example of a picture to be a recognition target.
Figures 16A, 16B:
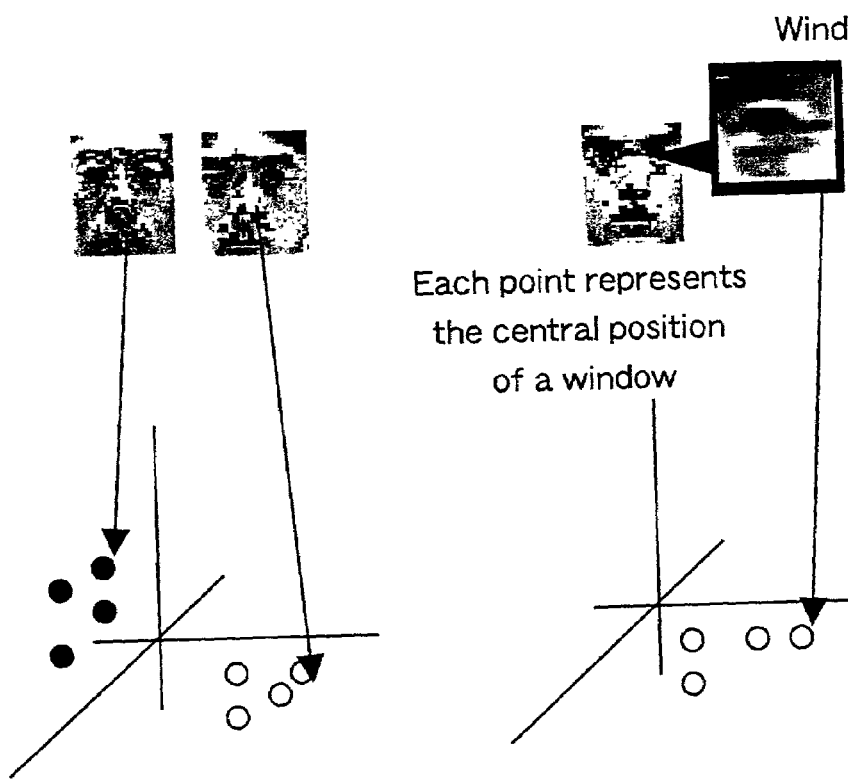
FIG. 16 shows a state in which a local region is selected as a window picture based on feature points.
Figure 17:
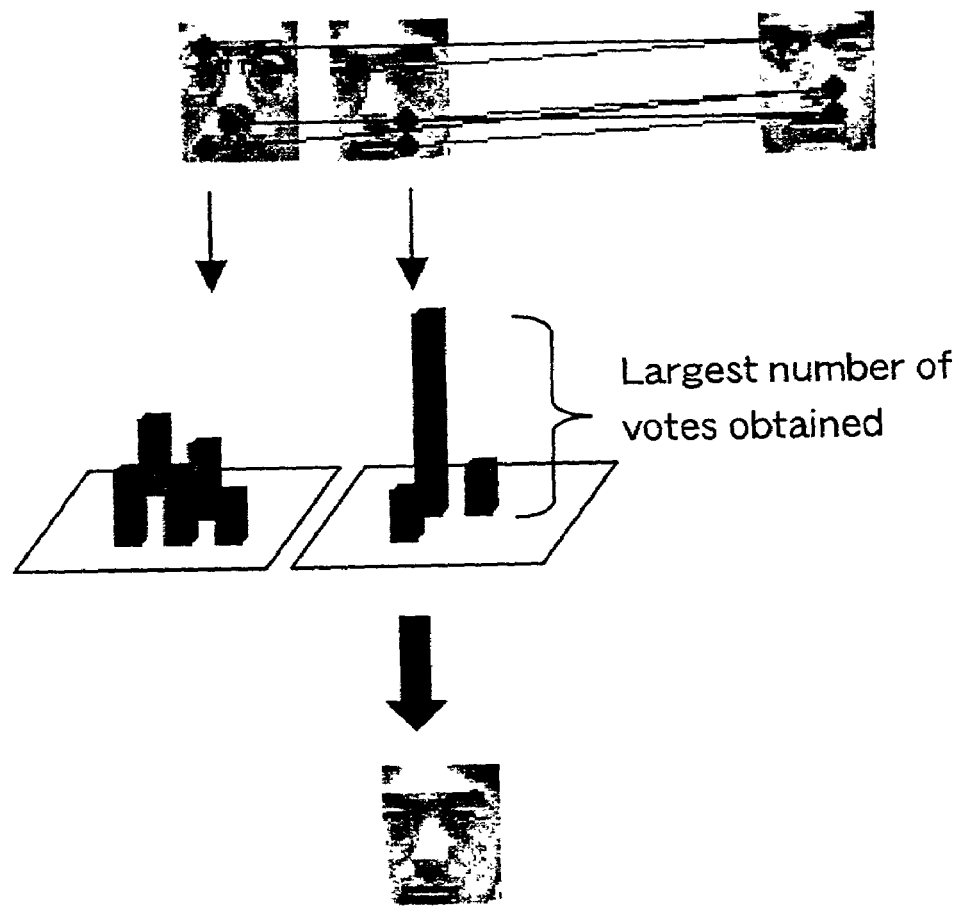
FIG. 17 shows a state in which voting is conducted with respect to a corresponding grid on a voting map, based on a relative position in a pair of window pictures.

The picture matching processing system of the present invention can be constructed, using various computers by storing a program describing processing steps of realizing the above-mentioned structure in a computer-readable recording medium. Examples of the recording media storing a program including processing steps of realizing the picture matching processing system of the present invention include a recording medium 1200 in a recording apparatus on a network and a recording medium 1205 such as a hard disk and a RAM of a computer, as well as a portable recording medium 1201 such as a CD-ROM 1202 and a flexible disk 1203, as shown in FIG. 12. In execution, the program is loaded onto a computer 1204, and executed on a main memory.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A picture matching processing system, comprising:
   a window picture cutting part for cutting out a characteristic window picture group from previously captured pictures of a recognition target in different capturing environments;
   a capturing environment variation influence evaluating part for evaluating influence of variations in the capturing environments of the cut out window picture group; and
   a window picture selecting part for selecting a window picture in which the influence of variations in a capturing environment is at a predetermined level or less from among the cut out window picture group, based on results of the evaluation of the influence of variations in the capturing environments,
   wherein picture matching is conducted by using the selected window picture.

2. The picture matching processing system according to claim 1, comprising a recognition target picture region cutting part for detecting a recognition target picture region from each picture of the previously captured pictures of the recognition target, and setting the recognition target picture region as a window picture in the cut out window picture group.

3. The picture matching processing system according to claim 1, wherein a capturing environment is a relative position and a relative direction between the recognition target and a camera.

4. The picture matching processing system according to claim 1, comprising a window picture selection result display part for displaying selection results of a window picture by the window picture selecting part, and a window picture selection correcting part for correcting selection of a window picture selected by the window picture selecting part.

5. A picture matching processing system, comprising:
   a picture group input part for previously capturing a plurality of pictures of a recognition target in different capturing environments to organize them as a picture group;
   a window picture cutting part for cutting out a characteristic window picture group from each picture of the recognition target;
   a feature value calculating part for calculating a feature value representing features of the cut out window pictures; and
   a stable window picture selecting part for
      setting a window picture group in which window pictures correspond to each other in the same site of the recognition target as a window picture set, among the window pictures cut out from each selected picture,
      comparing feature values of the window pictures contained in the window picture set, and
      selecting, as a stable window picture, only a window picture set in which a variation width of the feature value is within a predetermined threshold value,
   wherein picture matching is conducted by using the selected stable window picture.

6. A picture matching processing system according to claim 5, wherein the picture group is a continuous picture group in which a capturing environment is continuously changed, and
   in comparison of the feature values of the window pictures contained in the window picture group, a feature value of the window picture cut out from a first picture of the continuous picture group, a feature value of the window picture cut out from a last picture of the continuous picture group, and a feature value of the window picture cut out from at least one selected intermediate picture are compared with each other.

7. A picture matching processing system according to any one of claim 5, comprising a recognition target picture region cutting part for detecting a recognition target picture region from each picture of the picture group, and setting the recognition target picture region as a cut out picture group.

8. A picture matching processing system according to any one of claim 5, wherein the capturing environment is a relative position and a relative 10 direction between a recognition target and a camera.

9. A picture matching processing system according to any one of claim 5, comprising a window picture selection result display part for displaying selection results of a window picture by the window picture selecting part, and a window picture selection correcting part for correcting selection of a window picture by the window picture selecting part.

10. A picture matching processing system, comprising:
    a picture group input part for previously inputting a plurality of pictures of a recognition target in different capturing environments to organize them as a picture group;

a window picture cutting part for cutting out a characteristic window picture group from each picture of the recognition target;

a feature value calculating part for calculating a feature value representing features of the cut out window pictures; and a projecting part for setting a window picture group in which window pictures correspond to each other in the same site of the recognition target, among the window pictures cut out from each selected picture, and projecting the window picture group onto an eigen space having the feature value as a parameter, in accordance with the feature value, wherein the projecting part, in selecting a window picture used for projection, selects a window picture cut out from a first picture of the continuous picture group, a window picture cut out from a last picture of the continuous picture group, and a window picture cut out from a selected intermediate picture in the continuous picture group, in accordance with a projection point tracking precision, wherein picture matching is conducted by using the selected window pictures.

11. A computer-readable recording medium storing a processing program controlling a picture matching processing system according to a process comprising:

cutting out a characteristic window picture group from previously captured pictures of a recognition target in different capturing environments;

evaluating influence of variations in the capturing environments of the cut out window picture group; and selecting a window picture that is unlikely to be influenced by the variations in a capturing environment under a predetermined standard from among the cut out window picture group, based on results of the capturing environment variation influence evaluating, wherein picture matching is conducted using the selected window picture.

12. A computer-readable recording medium storing a processing program for realizing a picture matching processing system, the program comprising:

picture group input processing of previously inputting a plurality of pictures of a recognition target in different capturing environments to organize them as a picture group;

window picture cutting processing of cutting out a characteristic window picture group from each picture of the recognition target;

feature value calculating processing of calculating a feature value representing features of the cut out window picture group for evaluating influence of variations in the capturing environments of the cut out window picture group; and window picture selecting processing of preferentially selecting a window picture in which variations in a calculated feature value caused by a difference in a capturing environment are small, among the window picture group cut out from each picture of the recognition target, wherein picture matching is conducted by using the selected window picture.

13. A computer-readable recording medium storing a processing program for realizing a picture matching processing system, the program comprising:

picture group input processing of previously inputting a plurality of pictures of a recognition target in different capturing environments to organize them as a picture group;

window picture cutting processing of cutting out a characteristic window picture group from each picture of the recognition target;

feature value calculating processing for calculating a feature value representing features of the cut out window picture group for evaluating influence of variations in the capturing environments of the cut out window picture group; and window picture selecting processing of comparing the calculated feature values of the window pictures corresponding to each other in a same site of the recognition target as a window picture set, among the window pictures cut out from each selected picture, and selecting only a window picture set in which a difference in a calculated feature value is within a predetermined threshold value, wherein picture matching is conducted by using the selected window picture.

14. A computer-readable recording medium storing a processing program for realizing a picture matching processing system, the program comprising:

picture group input processing of previously inputting a plurality of pictures of a recognition target in different capturing environments to organize them as a picture group;

window picture cutting processing of cutting out a characteristic window picture group from each picture of the recognition target;

feature value calculating processing of calculating a feature value representing features of the cut out window pictures; and stable window picture selecting processing of setting a window picture group in which window pictures correspond to each other in the same site of the recognition target as a window picture set, among the window pictures cut out from each selected picture, comparing feature values of the window pictures contained in the window picture set, and selecting, as a stable window picture, only a window picture set in which a variation width of the feature value is within a predetermined threshold value, wherein picture matching is conducted by using the selected stable window picture.

15. A computer-readable recording medium storing a processing program for realizing a picture matching processing system, the program comprising:

picture group input processing of previously inputting a plurality of pictures of a recognition target in different capturing environments to organize them as a picture group;

window picture cutting processing of cutting out a characteristic window picture group from each picture of the recognition target;

feature value calculating processing of calculating a feature value representing features of the cut out window pictures; and projecting processing of setting a window picture group in which window pictures correspond to each other in the same site of the recognition target, among the window pictures cut out from each selected picture, and projecting the window picture group onto an eigen space having the feature value as a parameter, in accordance with the feature value, wherein the projecting processing, in selecting a window picture used for projection, selects a window picture cut out from a first picture of the continuous picture group, a window picture cut out from a last picture of the continuous picture group, and a window picture cut out from a selected intermediate picture in the continuous picture group, in accordance with a projection point tracking precision, wherein picture matching is conducted by using the selected window pictures.

* * * * *